US009266057B1

(12) United States Patent
Jones

(10) Patent No.: US 9,266,057 B1
(45) Date of Patent: Feb. 23, 2016

(54) PROCESS OR SEPARATING AND ENRICHING CARBON DIOXIDE FROM ATMOSPHERIC GASES IN AIR OR FROM ATMOSPHERIC GASES DISSOLVED IN NATURAL WATER IN EQUILIBRIUM WITH AIR

(71) Applicant: Robert Lee Jones, Deming, NM (US)

(72) Inventor: Robert Lee Jones, Deming, NM (US)

( * ) Notice: Subject to any disclaimer, the term of this patent is extended or adjusted under 35 U.S.C. 154(b) by 0 days.

(21) Appl. No.: 14/697,466

(22) Filed: Apr. 27, 2015

(51) Int. Cl.
*B01D 53/14* (2006.01)

(52) U.S. Cl.
CPC ........ *B01D 53/1475* (2013.01); *B01D 53/1406* (2013.01); *B01D 2252/103* (2013.01)

(58) Field of Classification Search
None
See application file for complete search history.

(56) References Cited

U.S. PATENT DOCUMENTS

| | | | | |
|---|---|---|---|---|
| 7,655,069 B2* | 2/2010 | Wright | ............... | B01D 53/025 55/524 |
| 7,708,806 B2* | 5/2010 | Wright | ................ | B01D 53/04 264/39 |
| 7,833,328 B2* | 11/2010 | Lackner | ............. | B01D 53/1475 423/210 |
| 8,088,197 B2* | 1/2012 | Wright | ................ | B01D 53/02 95/139 |
| 8,119,091 B2* | 2/2012 | Keith | .................. | B01D 53/62 423/220 |
| 8,133,305 B2* | 3/2012 | Lackner | ............. | B01D 53/0462 423/230 |
| 8,500,868 B2* | 8/2013 | Adams, II | ............ | B01D 53/265 95/247 |
| 8,702,847 B2* | 4/2014 | Lackner | ................ | B01D 53/62 423/220 |
| 8,871,008 B2* | 10/2014 | Henderson | ......... | B01D 53/1425 95/172 |
| 8,894,747 B2* | 11/2014 | Eisenberger | ....... | B01D 53/1475 423/220 |
| 2004/0057886 A1* | 3/2004 | Paulsen | ............. | B01D 53/1493 423/220 |
| 2012/0111189 A1 | 5/2012 | Knudsen et al. | | |
| 2015/0075375 A1 | 3/2015 | Blout | | |

FOREIGN PATENT DOCUMENTS

| | | |
|---|---|---|
| CA | 2753468 A1 | 9/2010 |
| CN | 102481520 A | 5/2012 |
| EP | 2405990 A1 | 1/2012 |
| EP | 2405990 A4 | 1/2013 |
| WO | 2010104402 A1 | 9/2010 |
| WO | 2015/039066 | 3/2015 |

* cited by examiner

*Primary Examiner* — Duane Smith
*Assistant Examiner* — Phillip Shao

(57) ABSTRACT

A process is proposed that captures, separates, and enriches carbon dioxide for sequestration after removal from water in equilibrium with air. The proposed process recognizes that carbon dioxide is more soluble in water than other atmospheric gases in air resulting in the proportion of carbon dioxide adsorbed in water from the atmosphere (relative to the other atmospheric gases) being higher than the proportion of carbon dioxide naturally occurring in air. To capitalize on this "convenient truth," the proposed process aerates (dissolves) in water carbon dioxide gas with other atmospheric gases originating from air in an aerator (aeration) according to Henry's gas law of solubility and then deaerates (strips) these dissolved atmospheric gases from the water in a deaerator (deaeration). The process of aeration and deaeration of these atmospheric gases is repeated multiple times in series until the separated and enriched carbon dioxide gas concentration purity is sufficient for sequestration.

1 Claim, 14 Drawing Sheets

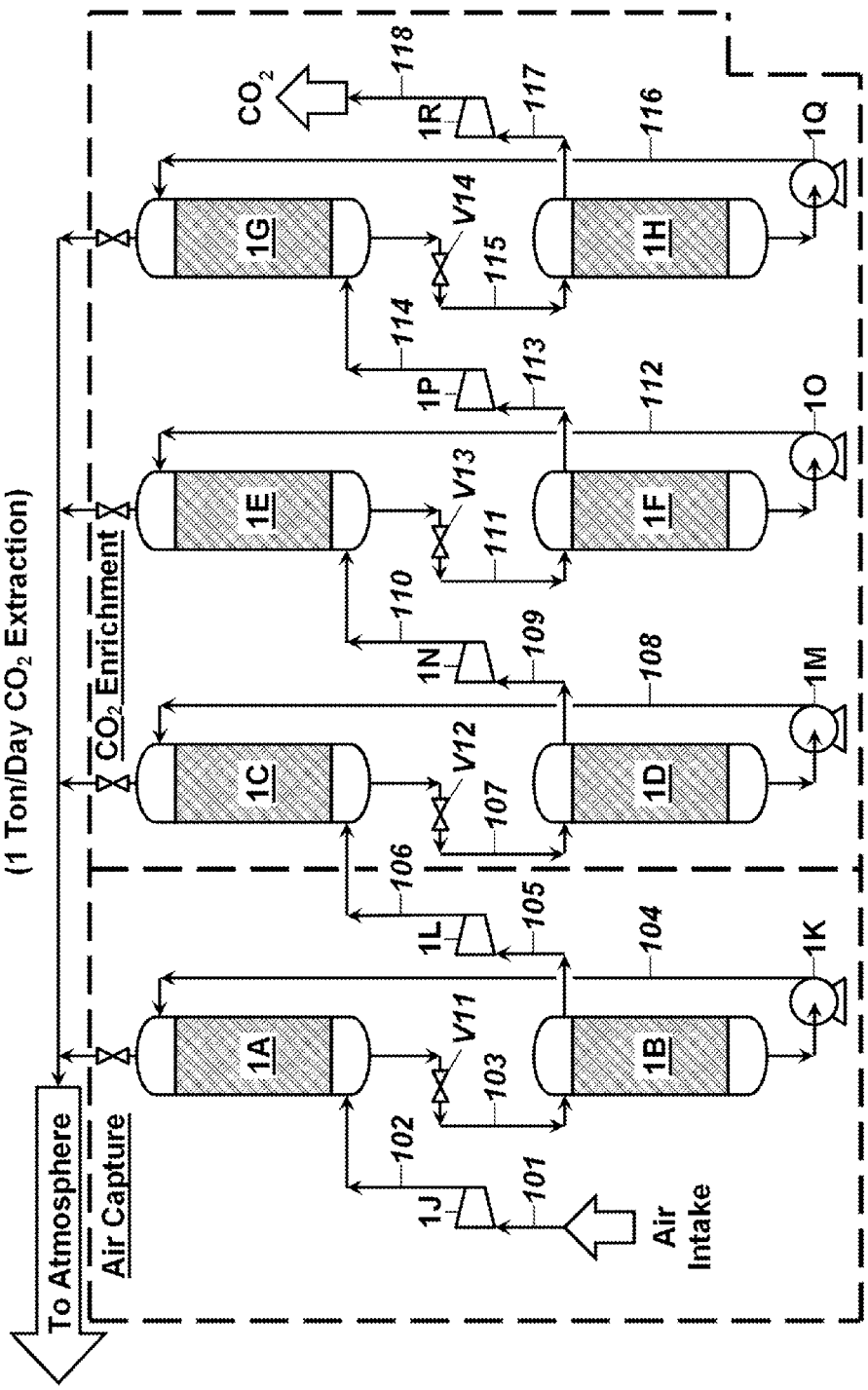

FIG 4B

Major Process Equipment for Process Flow Diagram in FIG 4A

| Equip. Number | Equipment Name | Pressure PSIA | Temp. °F |
|---|---|---|---|
| 1A | Air Capture Stage Aerator | 147 | ~32 |
| 1B | Air Capture Stage Deaerator | 14.7 | ~32 |
| 1C | $CO_2$ Enrichment Stage 1 Aerator | 147 | ~32 |
| 1D | $CO_2$ Enrichment Stage 1 Deaerator | 14.7 | ~32 |
| 1E | $CO_2$ Enrichment Stage 2 Aerator | 147 | ~32 |
| 1F | $CO_2$ Enrichment Stage 2 Deaerator | 14.7 | ~32 |
| 1G | $CO_2$ Enrichment Stage 3 Aerator | 147 | ~32 |
| 1H | $CO_2$ Enrichment Stage 3 Deaerator | 14.7 | ~32 |

FIG 4C

Minor Process Equipment for Process Flow Diagram in FIG 4A

| Equip. Number | Equipment Name |
|---|---|
| 1J | Air Capture Stage Inlet Air Compressor |
| 1K | Air Capture Stage Water Recycle Pump |
| 1L | Air Capture Stage Gas Outlet Compressor |
| 1M | $CO_2$ Enrichment Stage 1 Water Recycle Pump |
| 1N | $CO_2$ Enrichment Stage 1 Gas Outlet Compressor |
| 1O | $CO_2$ Enrichment Stage 2 Water Recycle Pump |
| 1P | $CO_2$ Enrichment Stage 2 Gas Outlet Compressor |
| 1Q | $CO_2$ Enrichment Stage 3 Water Recycle Pump |
| 1R | $CO_2$ Enrichment Stage 3 $CO_2$ Outlet Compressor |

FIG 4D

Stream Properties for Process Flow Diagram in FIG 4A

| Stream Number | Air/Gas Flow ACFM | Water Flow GPM | Pressure PSIA | Temperature °F |
|---|---|---|---|---|
| 101 | 28,430 | - | 14.7 | AMB |
| 102 | 2,843 | - | 147 | ~32 |
| 103 | - | 13,680 | 14.7 | ~32 |
| 104 | - | 13,680 | 147 | ~32 |
| 105 | 481 | - | 14.7 | ~32 |
| 106 | 48.1 | - | 147 | ~32 |
| 107 | - | 231.3 | 14.7 | ~32 |
| 108 | | 231.3 | 147 | ~32 |
| 109 | 20.3 | - | 14.7 | ~32 |
| 110 | 2.03 | - | 147 | ~32 |
| 111 | | 9.76 | 14.7 | ~32 |
| 112 | | 9.76 | 147 | ~32 |
| 113 | 11.6 | - | 14.7 | ~32 |
| 114 | 1.16 | - | 147 | ~32 |
| 115 | | 5.57 | 14.7 | ~32 |
| 116 | | 5.57 | 147 | ~32 |
| 117 | 11.4 | - | 14.7 | ~32 |
| 118 | 1.14 | - | 147 | ~32 |

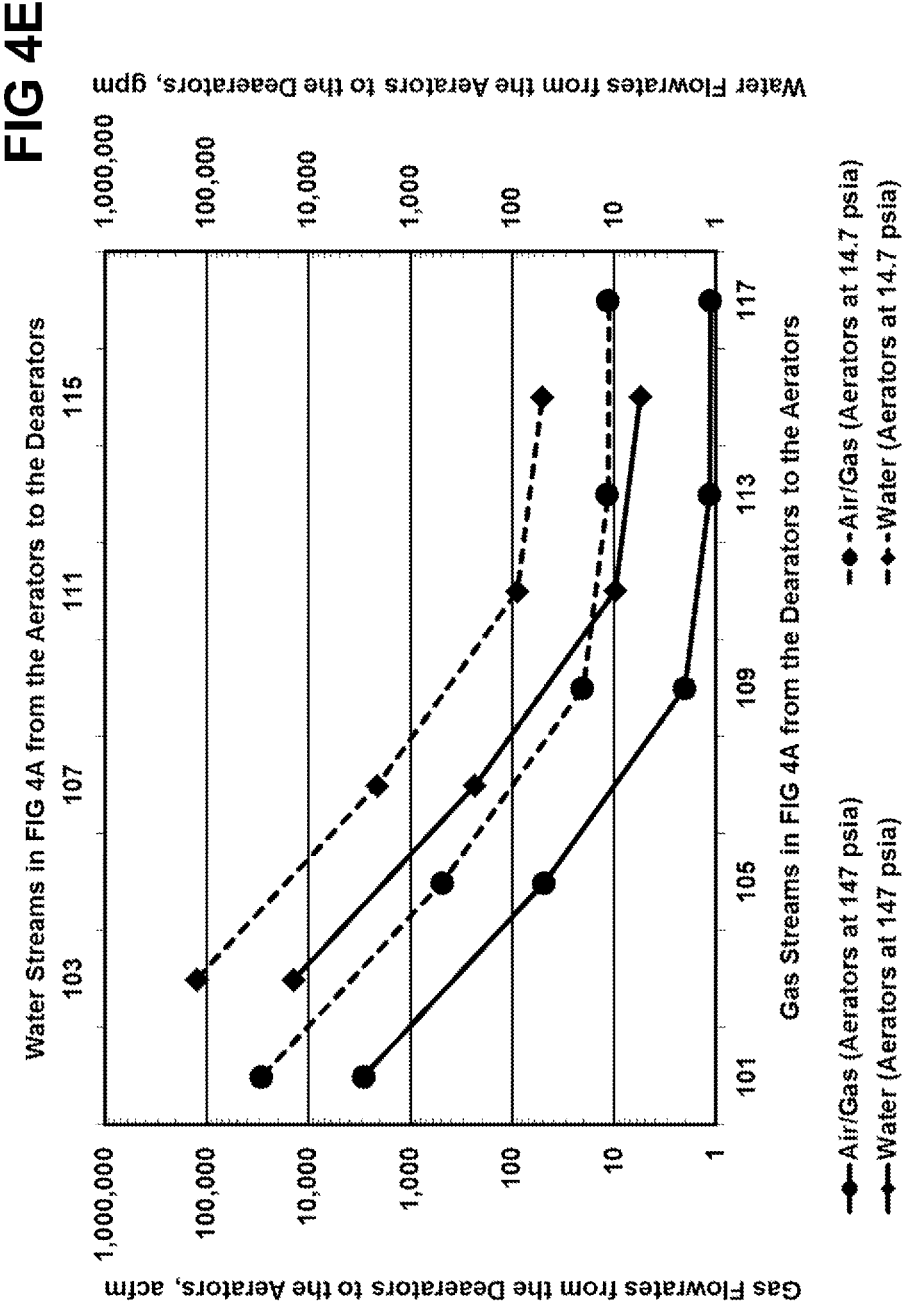

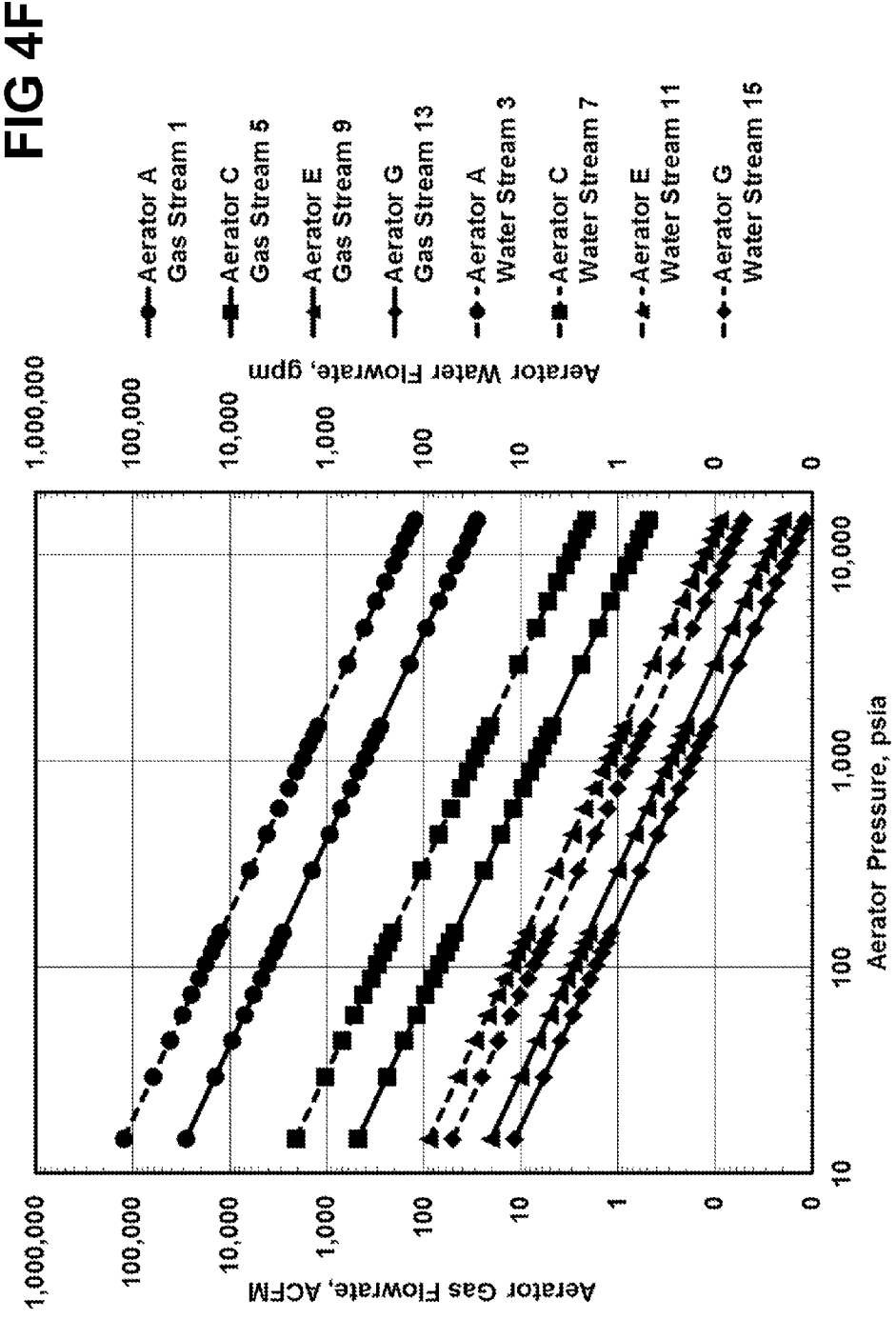

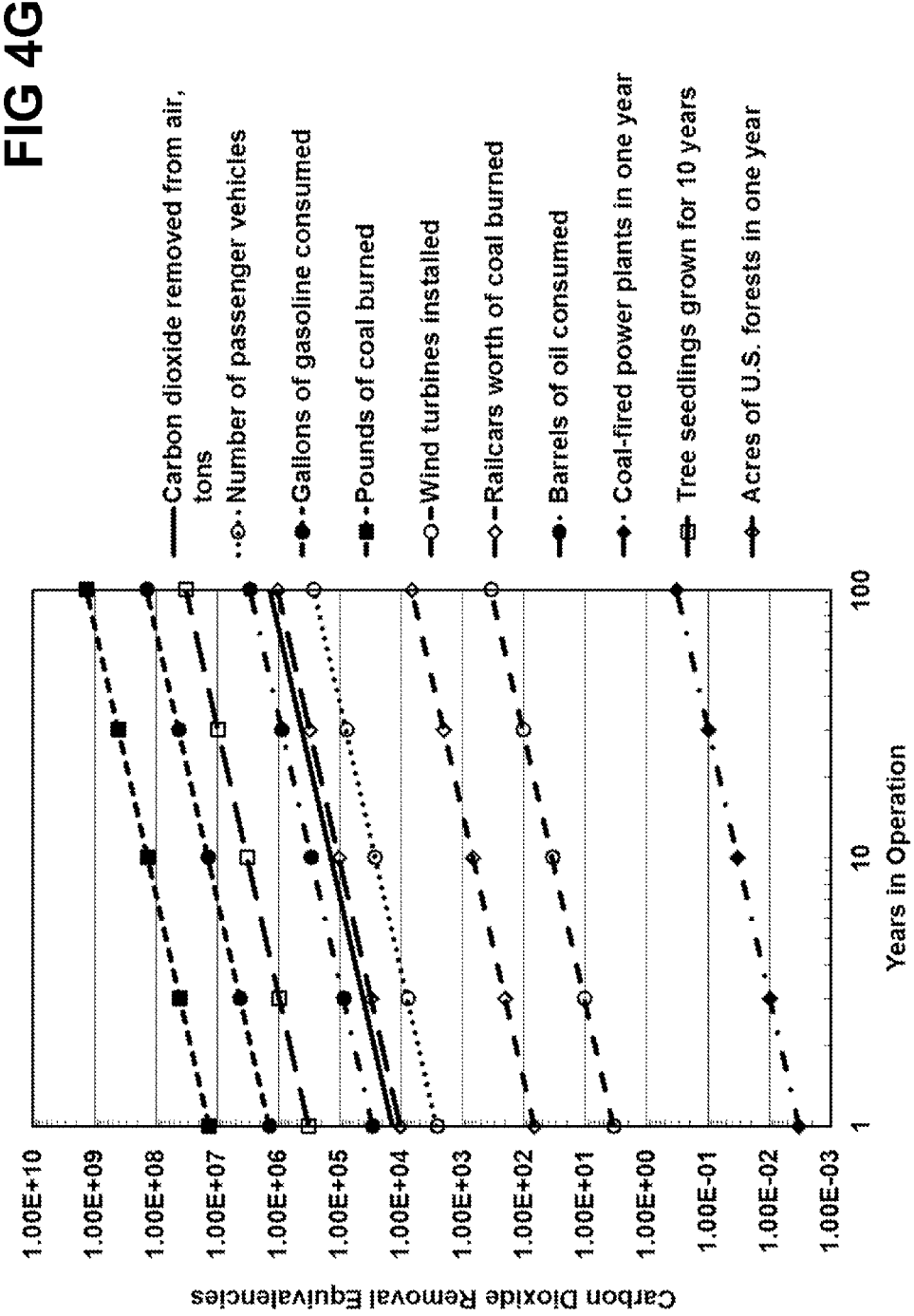

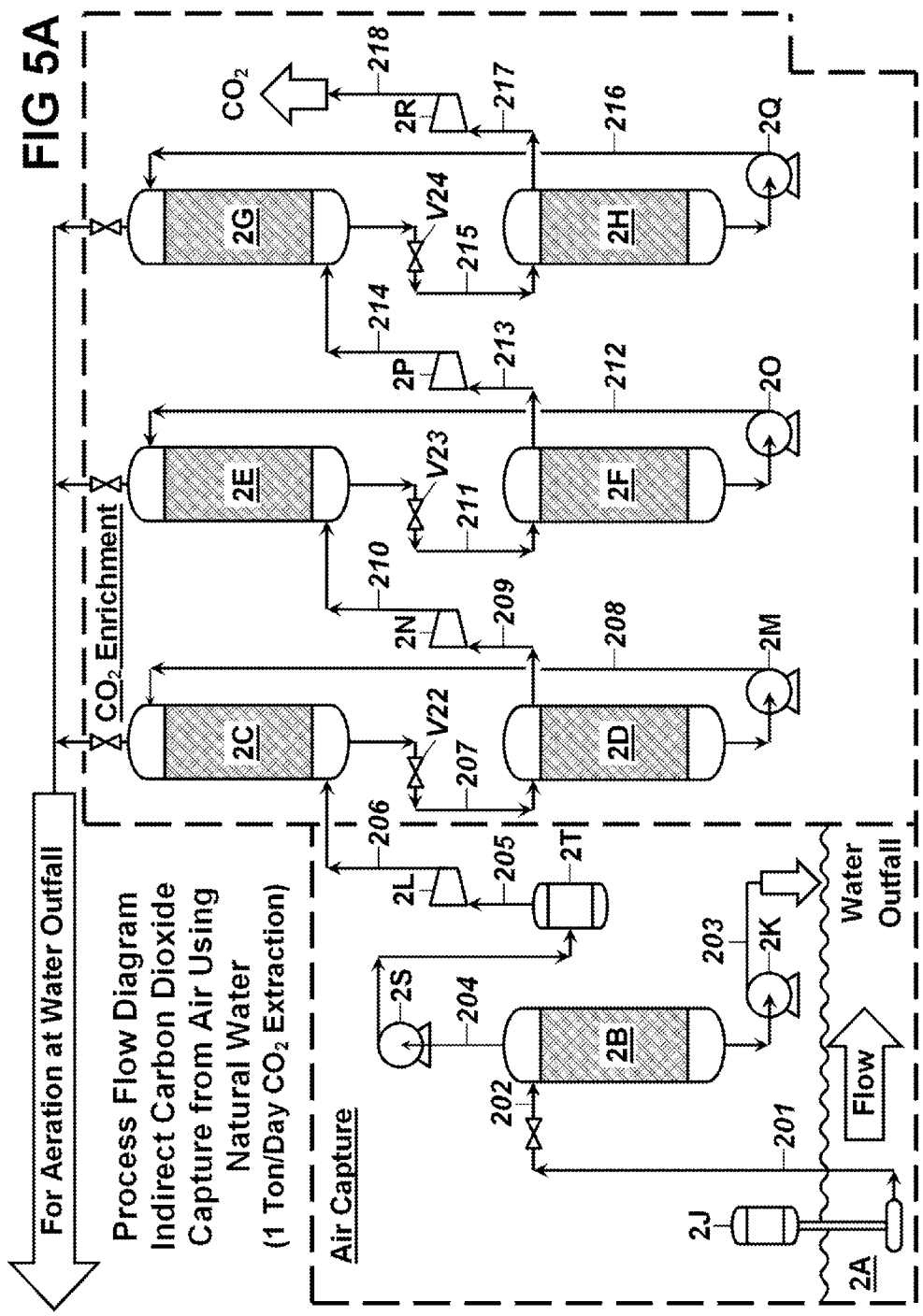

FIG 5B

Major Process Equipment for Process Flow Diagram in FIG 5A

| Equip. Number | Equipment Name | Pressure PSIA | Temp. °F |
|---|---|---|---|
| 2A | Natural Water Aeration | 14.7 | ~32 |
| 2B | Natural Water Deaerator | 14.7 | ~32 |
| 2C | $CO_2$ Enrichment Stage 1 Aerator | 147 | ~32 |
| 2D | $CO_2$ Enrichment Stage 1 Deaerator | 14.7 | ~32 |
| 2E | $CO_2$ Enrichment Stage 2 Aerator | 147 | ~32 |
| 2F | $CO_2$ Enrichment Stage 2 Deaerator | 14.7 | ~32 |
| 2G | $CO_2$ Enrichment Stage 3 Aerator | 147 | ~32 |
| 2H | $CO_2$ Enrichment Stage 3 Deaerator | 14.7 | ~32 |

FIG 5C

Minor Process Equipment for Process Flow Diagram in FIG 5A

| Equip. Number | Equipment Name |
|---|---|
| 2J | Natural Water Inlet Pump |
| 2K | Natural Water Outlet Pump |
| 2L | Air Capture Stage Gas Outlet Compressor |
| 2M | $CO_2$ Enrichment Stage 1 Water Recycle Pump |
| 2N | $CO_2$ Enrichment Stage 1 Gas Outlet Compressor |
| 2O | $CO_2$ Enrichment Stage 2 Water Recycle Pump |
| 2P | $CO_2$ Enrichment Stage 2 Gas Outlet Compressor |
| 2Q | $CO_2$ Enrichment Stage 3 Water Recycle Pump |
| 2R | $CO_2$ Enrichment Stage 3 $CO_2$ Outlet Compressor |
| 2S | Air Capture Stage Vacuum Pump |
| 2T | Air Capture Stage Gas Accumulator Drum |

FIG 5D

Stream Properties for Process Flow Diagram in FIG 5A

| Stream Number | Air/Gas Flow ACFM | Water Flow GPM | Pressure PSIA | Temperature °F |
|---|---|---|---|---|
| 201 | - | 124,367 | 14.7 | ~32 |
| 202 | - | 124,367 | ~1 | ~32 |
| 203 | - | 124,367 | 14.7 | ~32 |
| 204 | ~7,071 | - | ~1 | ~32 |
| 205 | 481 | - | 14.7 | ~32 |
| 206 | 48.1 | - | 147 | ~32 |
| 207 | - | 231.3 | 14.7 | ~32 |
| 208 | | 231.3 | 147 | ~32 |
| 209 | 20.3 | - | 14.7 | ~32 |
| 210 | 2.03 | - | 147 | ~32 |
| 211 | | 9.76 | 14.7 | ~32 |
| 212 | | 9.76 | 147 | ~32 |
| 213 | 11.6 | - | 14.7 | ~32 |
| 214 | 1.16 | - | 147 | ~32 |
| 215 | | 5.57 | 14.7 | ~32 |
| 216 | | 5.57 | 147 | ~32 |
| 217 | 11.4 | - | 14.7 | ~32 |
| 218 | 1.14 | - | 147 | ~32 |

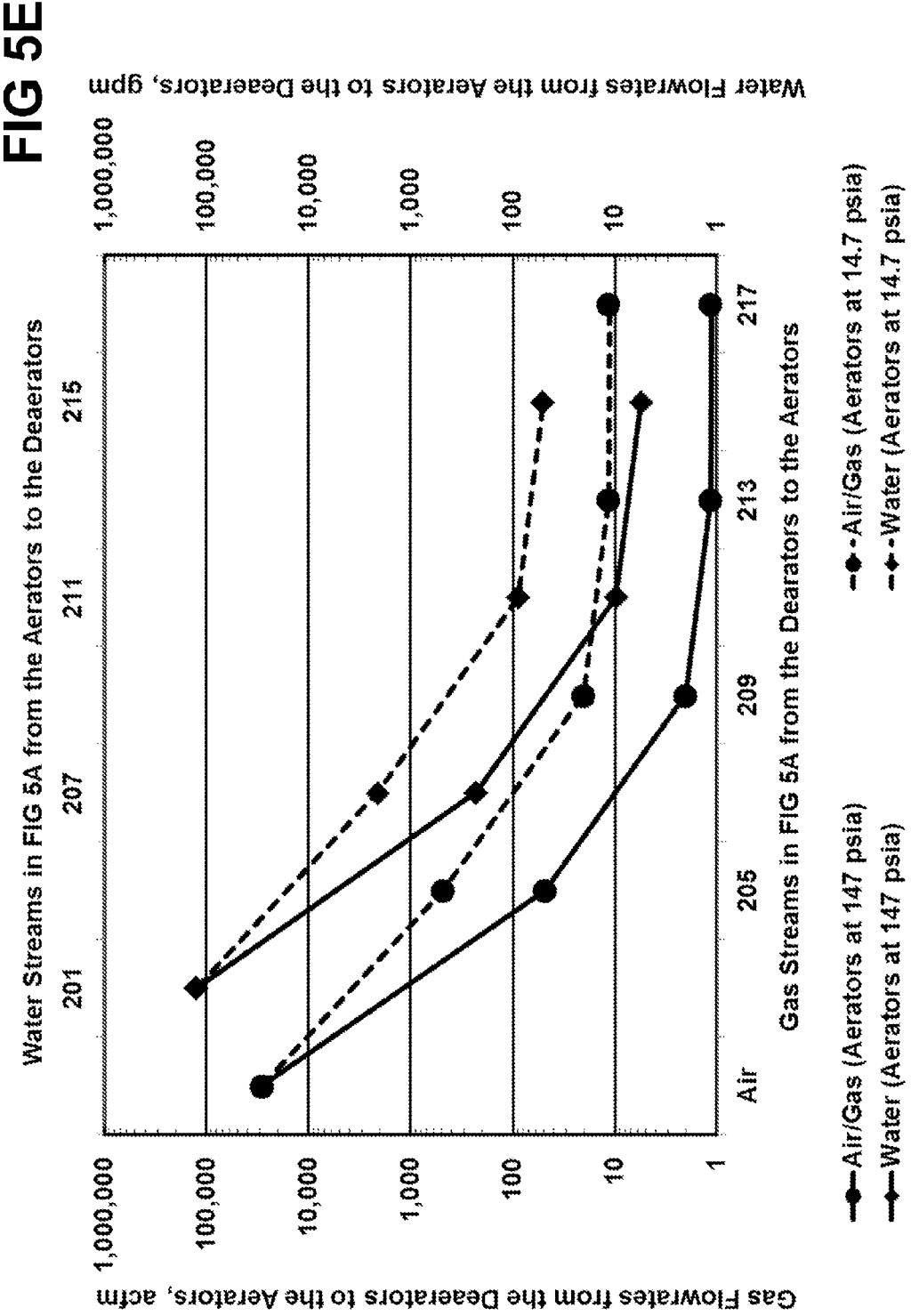

PROCESS OR SEPARATING AND ENRICHING CARBON DIOXIDE FROM ATMOSPHERIC GASES IN AIR OR FROM ATMOSPHERIC GASES DISSOLVED IN NATURAL WATER IN EQUILIBRIUM WITH AIR

CROSS-REFERENCE TO RELATED APPLICATIONS

Not Applicable

STATEMENT REGARDING TO FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The following is a tabulation of prior art that presently appears relevant:

| U.S. Patents: |
| --- |
| None |

| | | | | U.S. Patent Application Publications: | |
| --- | --- | --- | --- | --- | --- |
| Country Code | Publication Number | Kind Code | Publication Date | Applicant or Patentee | |
| US | 2012/0111189 | A1 | 2012 May 10 | Norsk Institutt for Luftforskning | |
| US | 2015/0075375 | A1 | 2015 Mar. 19 | Savannah River Nuclear Solutions, LLC | |

| | | | | Foreign Patent Documents: | |
| --- | --- | --- | --- | --- | --- |
| Country Code | Publication Number | Kind Code | Publication Date | Applicant or Patentee | |
| CA | 2753468 | A1 | 2010 Sep. 16 | Patent Identical to US2012/0111189A1 | |
| CN | 102481520 | A | 2012 May 30 | Patent Identical to US2012/0111189A1 | |
| EP | 2405990 | A1 | 2012 Jan. 18 | Patent Identical to US2012/0111189A1 | |
| EP | 2405990 | A4 | 2013 Jan. 9 | Patent Identical to US2012/0111189A1 | |
| WO | 2010/104402 | A1 | 2010 Sep. 16 | Patent Identical to US2012/0111189A1 | |
| WO | 2015/039066 | | 2015 Mar. 19 | Patent Identical to US2015/0075375A1 | |

| Nonpatent Literature Documents: |
| --- |
| None |

| | | | | Prior Art U.S. Patents Referenced and Discussed in the Specification of the Application: | |
| --- | --- | --- | --- | --- | --- |
| Country Code | Publication Number | Kind Code | Publication Date | Applicant | Patentee |
| US | 7,655,069 | B2 | Feb. 2, 2010 | Allen B. Wright Klaus S. Lackner Eddy J. Peters | Global Research Technologies, Llc |
| US | 7,708,806 | B2 | May 4, 2010 | Allen B. Wright Klaus S. Lackner Ursula Ginster | Global Research Technologies, Llc. |
| US | 7,833,328 | B2 | Nov. 16, 2010 | Klaus Lackner Allen Wright | The Trustees of Columbia University in the City of New York, Kilimanjaro Energy, Inc. |
| US | 8,088,197 | B2 | Jan. 3, 2012 | Allen Wright Klaus Lackner, et al. | Kilimanjaro Energy, Inc. |
| US | 8,133,305 | B2 | Mar. 13, 2012 | Klaus Lackner Allen Wright | Kilimanjaro Energy, Inc. |
| US | 8,702,847 | B2 | Apr. 22, 2014 | Klaus S. Lackner Frank S. Zeman | |
| US | 8,119,091 | B2 | Feb. 21, 2012 | David Keith Maryam Mahmoudkhani | Carbon Engineering Limited Partnership |
| US | 8,871,008 | B2 | Oct. 28, 2014 | Matthew Henderson David Keith, et al. | Carbon Engineering Limited Partnership |
| US | 8,894,747 | B2 | Nov. 25, 2014 | Peter Eisenberger Graciela Chichilnisky | |

-continued

Prior Art U.S. Patents Referenced by Examiner:

| Country Code | Publication Number | Kind Code | Publication Date | Applicant | Patentee |
|---|---|---|---|---|---|
| Title: Removal of $H_2S$ and $CO_2$ from a Hydrocarbon Fluid Stream | | | | | |
| US | 6,881,389 | B2 | Apr. 19, 2005 | Dwight C. Paulsen | Edg, Inc. |
| US | 20040057886 | A1 | Mar. 25, 2004 | Leon G. Barnett Wayne C. Page | |
| Title: Systems and Methods for the Separation of Carbon Dioxide and Water | | | | | |
| US | 8,500,868 | B2 | Aug. 6, 2013 | Alan Adams II Thomas | Massachusetts |
| US | 20100279181 | A1 | Nov. 4, 2010 | Paul Inigo Barton | Institute of Technology |
| WO | 2010126617 | A1 | Nov. 4, 2010 | | |

The following is an overview of the background of the Patent Application. Methods of removing carbon dioxide from the atmosphere as a means of reducing global warming is presented based on information from websites on the internet or from reports found on the internet.

I. The Problem

The following is from the website of Climate.gov—Science and Information for a Climate Smart Nation, entitled, "*Global Warming Frequently Asked Questions*," (https://www.climate.gov/news-features/understanding-climate/global-warming-frequently-asked-questions#hide7).

Human activities have increased the abundance of heat-trapping gases in the atmosphere, which a large majority of climate scientists agree is the main reason for the 1.5° F. (0.85° C.) rise in average global temperature since 1880. Carbon dioxide is the heat-trapping gas primarily responsible for the rise but methane, nitrous oxide, ozone, and various other very long-lived heat-trapping gases also contribute. Carbon dioxide is of greatest concern because its rate of increase is exerting a larger overall warming influence than all of those other gases combined, and because carbon dioxide levels in the atmosphere will remain elevated for centuries unless we implement a way to remove carbon dioxide from the atmosphere effectively and economically. Most carbon dioxide from human activities is released from burning coal and other fossil fuels. Other human activities, including deforestation, biomass burning, and cement production also produce carbon dioxide.

There is overwhelming scientific evidence that Earth is warming and a preponderance of scientific evidence that human activities are the main cause. Thousands of weather stations worldwide, over land and ocean, have been recording daily high and low temperatures for many decades and, in some locations, for more than a century. When different scientific and technical teams in different U.S. agencies (e.g., NOAA and NASA) and in other countries (e.g., the U.K.'s Hadley Centre) average these data together, essentially the same results are found; Earth's average surface temperature has risen by about 1.5° F. (0.85° C.) since 1880.

The primary cause is that, over the last 200 years, human activities have added about 500 billion metric tons of carbon dioxide to the atmosphere, increasing the abundance of this heat-trapping gas by about 40 percent. Today, humans add about 70 million metric tons of carbon dioxide to the atmosphere every day. The amount of carbon dioxide in the atmosphere has increased from about 278 parts per million (ppm) in 1800 to about 398 ppm today. Today's carbon dioxide levels are unusually high; much higher than at any other time in the last 800,000 years. The warming influence of heat-trapping gases was recognized in the mid-1800s.

Additionally, many other lines of evidence confirm that our world has warmed over multiple decades:
  Sea surface temperatures have increased.
  Air temperatures aloft are increasing, according to weather balloons and satellites.
  Birds are migrating earlier and their migration patterns are changing.
  Plants are blooming earlier in the spring.
  Fish species are migrating northward and toward cooler, deeper waters.
  Overall, glaciers are melting and spring snow cover is declining in the Northern Hemisphere.
  Greenland's ice sheet—which holds about 8% of Earth's fresh water—is melting at an accelerating rate.
  Mean global sea level is rising.
  Summertime Arctic sea ice is declining rapidly in both thickness and extent.

Human activities emit about 135 times more carbon dioxide than volcanoes do in a typical year. Volcanoes emit between 0.2 and 0.3 billion tons of carbon dioxide per year whereas human activities emit about 29 billion tons of carbon dioxide per year.

II. Magnitude of the Problem

A. Carbon Dioxide Concentration in the Air

The following is from the website of $CO_2$Now.org (http://co2now.org/).

Carbon dioxide ($CO_2$) is the chief greenhouse gas that results from human activities and causes global warming and climate change. To see whether enough is being done at the moment to solve these global problems, there is no single indicator as complete and current as the monthly updates for atmospheric $CO_2$ from the Mauna Loa Observatory.

The concentrations of $CO_2$ in the atmosphere are increasing at an accelerating rate from decade to decade. The latest atmospheric $CO_2$ data is consistent with a continuation of this long-standing trend. The upper safety limit for atmospheric $CO_2$ is 350 parts per million (ppm). Atmospheric $CO_2$ levels have stayed higher than 350 ppm since early 1988:
  The 2014 average annual concentration of $CO_2$ in the atmosphere (Mauna Loa Observatory) is 398.55 parts per million (ppm). The 2013 average is 396.48 ppm.
  For the past decade (2005-2014), the average annual increase is 2.1 ppm per year. The average for the prior decade (1995-2004) is 1.9 ppm per year.
  On May 10, 2013, NOAA & Scripps first reported daily averages that temporarily reached 400 ppm.

B. Number of Trees Equivalent to Carbon Dioxide Removed from Air

As it is difficult to visualize "tons" of carbon dioxide removed and/or sequestered from atmospheric air, American Forests have developed a rather "down-to-earth" measurement of carbon dioxide that we all can comprehend and conceptualize.

The following is from the website of American Forests, Protecting and Restoring Forests, entitled, "*Carbon Calculator Assumptions and Sources*," Copyright©, 2014, (http://www.americanforests.org/assumptions-and-sources/).

American Forests, a non-profit conservation organization established in 1875 and dedicated to protecting and restoring healthy forest ecosystems, have determined the amount of carbon that is sequestered in a single tree to be as follows:

American Forests assumes (see below) that one acre of trees stores 50.8 metric tons of carbon, which is approximately equivalent to 186 metric tons (410,060 pounds) of $CO_2$ sequestered per acre of forest.

American Forests estimates that their tree planting projects average 450 trees per acre.

American Forests calculates that with 410,060 pounds of $CO_2$ sequestered per acre of forest and with 450 trees planted per acre, approximately 911 pounds of $CO_2$ are sequestered per tree.

Conversion factors are as follows:

1 ton of carbon=3.666 tons of $CO_2$, which represents the weight of carbon dioxide (44) divided by the atomic mass of carbon (12)

1 metric ton=2204.62262 pounds

American Forests made the following assumptions:

American Forests chose 55 years as the age for estimating carbon sequestration and storage.

American Forests started with the U.S. Forest Service's averages for carbon stored by trees (58.8 tons per acre) and made slight alterations for significant outliners, which gave them 50.8 metric tons per acre.

Additional sources used by American Forests include the following:

The United States Department of Agriculture

Forest Service, Methods for Calculating Forest Ecosystem and harvest Carbon with Standard Estimates for Forest Types of the United States, 2006, http://www.treesearch.fs.fed.us/pubs/22954

United States Department of Agriculture:

Forest Service, Carbon Storage, and Accumulation in United States Forest Ecosystems, 1992, http://www.nrs.fs.fed.us/pubs/gtr/gtr_wo059.pdf C. $CO_2$ Capture Required to Reduce $CO_2$ Content in Air from 400 to 300 ppm To grasp the extent of carbon dioxide capture required from the atmosphere to reduce the threat of global warming (regardless of the technology used to capture the carbon dioxide), calculations were done to determine the following:

The amount of carbon dioxide that would need to be removed from the atmosphere to reduce the global carbon dioxide content in the atmosphere from 400 ppm to 300 ppm.

The amount of air that would need to be treated to accomplish the task of reducing the global carbon dioxide content in the atmosphere from 400 ppm to 300 ppm.

The number of mature 55 year old trees that would otherwise need to be grown to remove the same amount of carbon dioxide from the air.

The size of the forest(s) necessary to contain these trees.

The calculations assume that the mass of air in the atmosphere is equal to 5.136 (±0.007)×$10^{18}$ kg based on the following references:

Franco Verniani, "*The total mass of the Earth's atmosphere,*" *Journal of Geophysical Research*, Volume 71, Issue 2, pages 385-391, 15 Jan. 1966 (http://onlinelibrary.wiley.com/doi/10.1029/JZ071i002p00385/abstract).

Lide, David R., *Handbook of Chemistry and Physics*, Boca Raton, Fla.: CRC, 1996: 14-7 (http://hypertextbook.com/facts/1999/LouiseLiu.shtml).

The calculations also assume the following:

Carbon dioxide is neither added to nor removed from the global atmosphere nor is it transferred from the oceans to maintain equilibrium with the decreasing carbon dioxide concentration in the atmosphere (however, in reality, this carbon dioxide would also need to be removed from the atmosphere to reduce global warming).

Carbon dioxide removal from the air being treated is assumed to be 100%.

The results of these calculations are as follows:

Assuming 30,000 scfm air compressors, 23,800,000 (23.8 million) air compressors are needed to move the necessary 715,000,000,000 (715 billion) scfm air required for removal of 750,000,000,000 (750 billion) tons of carbon dioxide from the atmosphere.

Assuming one mature 55 year old tree contains 911 lbs (0.4555 tons) of carbon dioxide, 1,650,000,000,000 (1.65 trillion) mature 55 year old trees would need to be grown to equal the 750,000,000,000 (750 billion) tons of carbon dioxide removed from the atmosphere.

Assuming 450 mature 55 year old trees per acre of forest, 3,660,000,000 (3.66 billion) acres of forests would need to be created to contain the 1,650,000,000,000 (1.65 trillion) mature 55 year old trees that would need to be grown to equal the 750,000,000,000 (750 billion) tons of carbon dioxide removed from the atmosphere.

Given 640 acres per square mile, an equivalent 5,720,000 (5.72 million) square miles of forests would need to be created to contain the 1,650,000,000,000 (1.65 trillion) mature 55 year old trees that would need to be grown to equal the 750,000,000,000 (750 billion) tons of carbon dioxide removed from the atmosphere.

Note that the land area of the contiguous United States is 2,959,064 square miles. Add to this the land area of Alaska with 663,268 square miles and Hawaii with 10,931 square miles, the total land area of the United States is 3,633,263 square miles. ["*United States,*" Wikipedia, *the free encyclopedia*, http://en.wikipedia.org/wiki/United_States.]

FIG. 1 is a graph that plots the quantity of $CO_2$ capture from the atmosphere that is required to reduce the global atmospheric $CO_2$ concentration from 400 to 300 ppm over 100 years using 23.8 million 30,000 scfm air compressors.

III. Available Methods of Carbon Dioxide Removal (CDR) from Air

The following is from an article in the website of *Wikipedia, the free encyclopedia*, entitled, "*Carbon Dioxide Removal*" (http://en.wikipedia.org/wiki/Carbon_dioxide_removal).

Carbon dioxide removal (CDR) methods refer to a number of technologies that reduce the levels of carbon dioxide in the atmosphere. Among such technologies are bio-energy with carbon capture and storage, biochar, direct air capture, ocean fertilization and enhanced weathering. CDR is a different approach than removing $CO_2$ from the stack emissions of large fossil fuel point sources, such as power stations. The latter reduces emission to the atmosphere but cannot reduce the amount of carbon dioxide already in the atmosphere. As CDR removes carbon dioxide from the atmosphere, it creates negative emissions, offsetting emissions from small and dispersed point sources such as domestic heating systems, airplanes, and vehicle exhausts. It is regarded by some as a form of geoengineering, while other commentators regard it as a form of carbon capture and storage.

The likely need for CDR has been publicly expressed by a range of individuals and organizations involved with climate change issues, including IPCC chief Rajendra Pachauri, the UNFCCC executive secretary Christiana Figueres, and the World Watch Institute. Institutions with major programs focusing on CDR include the Lenfest Center for Sustainable Energy at the Earth Institute, Columbia University, and the Climate Decision Making Center, an international collaboration operated out of Carnegie-Mellon University's Department of Engineering and Public Policy.

The mitigation effectiveness of air capture is limited by societal investment, land use, and availability of geologic reservoirs. These reservoirs are estimated to be sufficient to sequester all anthropogenically generated $CO_2$.

Carbon dioxide removal (CDR) methods include the following:

Bio-Energy with Carbon Capture and Storage (BECCS)
Bio-energy with carbon capture and storage, or BECCS, utilises biomass to extract carbon dioxide from the atmosphere, and carbon capture and storage technologies to concentrate and permanently store it in deep geological formations.

BECCS is currently (as of October 2012) the only CDR technology deployed at full industrial scale, with 550 000 tonnes $CO_2$/year in total capacity operating, divided between three different facilities (as of January 2012).

The Imperial College London, the UK Met Office Hadley Centre for Climate Prediction and Research, the Tyndall Centre for Climate Change Research, the Walker Institute for Climate System Research, and the Grantham Institute for Climate Change issued a joint report on carbon dioxide removal technologies as part of the AVOID: Avoiding dangerous climate change research program, stating that "Overall, of the technologies studied in this report, BECCS has the greatest maturity and there are no major practical barriers to its introduction into today's energy system. The presence of a primary product will support early deployment."

According to the OECD, "Achieving lower concentration targets (450 ppm) depends significantly on the use of BECCS."

Biochar
Biochar is created by the pyrolysis of biomass, and is under investigation as a method of carbon sequestration.

Enhanced Weathering
Enhanced weathering refers to a chemical approach to geoengineering involving land or ocean based techniques. Examples of land based enhanced weathering techniques are in-situ carbonation of silicates. Ultramafic rocks, for example, have the potential to store thousands of years' worth of $CO_2$ emissions according to one estimate. Ocean based techniques involve alkalinity enhancement, such as, grinding, dispersing and dissolving olivine, limestone, silicates, or calcium hydroxide to address ocean acidification and $CO_2$ sequestration. Enhanced weathering is considered as one of the least expensive of geoengineering options. One example of a research project on the feasibility of enhanced weathering is the CarbFix project in Iceland.

Artificial Trees
A notable example of an atmospheric scrubbing process is the artificial tree. This concept, proposed by climate scientist Wallace S. Broecker and science writer Robert Kunzig, imagines huge numbers of artificial trees around the world to remove ambient $CO_2$. The technology is now being pioneered by Klaus Lackner, a researcher at the Earth Institute, Columbia University, whose artificial tree technology can suck up to 1,000 times more $CO_2$ from the air than real trees can, at a rate of about one ton of carbon per day if the artificial tree is approximately the size of an actual tree. The $CO_2$ would be captured in a filter and then removed from the filter and stored.

The chemistry used is a variant of that described below ($CO_2$ Scrubbing), as it is based on sodium hydroxide. However, in a more recent design proposed by Klaus Lackner, the process can be carried out at only 40 C by using a polymer-based ion exchange resin, which takes advantage of changes in humidity to prompt the release of captured $CO_2$, instead of using a kiln. This reduces the energy required to operate the process.

Scrubbing Towers
In 2008, the Discovery Channel covered the work of David Keith, of University of Calgary, who built a tower, 4 feet wide and 20 feet tall, with a fan at the bottom that sucks air in, which comes out again at the top. In the process, about half the $CO_2$ is removed from the air.

This device uses the chemical process described in detail below ($CO_2$ Scrubbing). The system demonstrated on the Discovery Channel was a 1/90,000th scale test system of the capture section; the reagents are regenerated in a separate facility. The main costs of a full plant will be the cost to build it, and the energy input to regenerate the chemicals and produce a pure stream of $CO_2$.

To put this into perspective, people in the U.S. emit about 20 tonnes of $CO_2$ per person annually. In other words, each person in the U.S. would require a tower like the one featured by the Discovery Channel to remove this amount of $CO_2$ from the air, requiring an annual 2 Megawatt-hours of electricity to operate it. By comparison, a refrigerator consumes about 1.2 Megawatt-hours annually (2001 figures). But by combining many small systems such as this into one large system the construction costs and energy use can be reduced.

It has been proposed that the Solar updraft tower to generate electricity from thermal air currents also be used at the same time for amine gravity scrubbing of $CO_2$. Some heat would be required to regenerate the amine.

$CO_2$ Scrubbing
Methods for scrubbing $CO_2$ from air including the following:

Calcium Oxide [Quicklime]
Calcium oxide (quicklime) will absorb $CO_2$ from atmospheric air mixed with steam at 400 C (forming calcium carbonate) and release it at 1,000 C. This process, proposed by Steinfeld, can be performed using renewable energy from thermal concentrated solar power.

Sodium Hydroxide
Zeman and Lackner outlined a specific method of air capture using sodium hydroxide. Carbon Engineering, a Calgary, Alberta firm founded in 2009 and partially funded by Bill Gates, is developing a process to capture carbon dioxide in a solution of sodium hydroxide with a pilot plant planned for 2014 with hopes to capture $CO_2$ at a cost of $100 a ton.

Carbon Dioxide Removal (CDR) Economic Factors

A crucial issue for CDR methods is their cost, which differs substantially among the different technologies, some which are not developed enough to perform cost assessments of. The American Physical Society estimates the costs for direct air capture to be $600/tonne with optimistic assumptions. The IEA Greenhouse Gas R&D Programme and Ecofys provides an estimate where 3.5 billion tonnes could be removed annually from the atmosphere with BECCS (Bio-Energy with Carbon Capture and Storage) at carbon prices as low as €50, whereas a report from Biorecro and the Global Carbon Capture and Storage Institute estimates costs "below €100" per tonne for large scale BECCS deployment.

Carbon Dioxide Removal (CDR) Risks, Problems, and Criticisms

CDR is slow to act, and requires a long-term political and engineering program to effect.

IV. Assessment of Carbon Dioxide Removal from Air Using Chemical Scrubbers

The following two reports have been written assessing direct air capture (DAC) of $CO_2$ using chemicals:
1. Report in the Proceedings of the National Academy of Sciences (PNAS)
   Kurt Zenz House, Antonio C. Baclig, Manya Ranjan, Ernst A. van Nierop, Jennifer Wilcox, and Howard J. Herzog, "Economic and Energetic Analysis of Capturing $CO_2$ from Ambient Air," Proceedings of the National Academy of Sciences (PNAS), Vol. 108, No. 51, Dec. 20, 2011.
2. Report by the American Physical Society (APS) Panel on Public Affairs (POPA)
   Socolow et al, "Direct Air Capture of $CO_2$ with Chemicals: A Technology Assessment for the APS Panel on Public Affairs," The American Physical Society, Washington D.C., Jun. 1, 2011.

The following article in Scientific America provides insights to the findings of the PNAS study report in an interview with two of the paper's co-authors:
   Umair Irfan and ClimateWire, "Scrubbing Carbon Dioxide from Air May Prove Too Costly, *Efforts to Remove $CO_2$ Directly from the Air are Likely to Prove Too Expensive to be Practical,*" Scientific American, Dec. 13, 2011 (Reprinted from Climatewire with permission from Environment & Energy Publishing, LLC, www.eenews.net, 202-628-6500).

The two reports and the article are discussed below.

A. Report in the Proceedings of the National Academy of Sciences (PNAS)

A study report published in the *Proceedings of the National Academy of Sciences (PNAS)*, entitled, "Economic and Energetic Analysis of Capturing $CO_2$ from Ambient Air," found that published costs for systems that capture $CO_2$ from the atmosphere ("air capture" systems) using typical industrial scrubbing systems (normally used for capturing richer concentrations of carbon dioxide discharged from factory and power plant smokestacks) are likely to have been underestimated. The published cost estimates for these air capture systems suggest that they may cost a few hundred dollars per tonne of $CO_2$, making them cost competitive with mainstream $CO_2$ mitigation options such as renewable energy, nuclear power, and carbon dioxide capture and storage from large $CO_2$ emitting point sources. However, the study suggests that the estimated total system costs of an air capture system will be on the order of $1,000 per tonne of $CO_2$ based on experience with actual as-built large-scale trace gas removal systems, which are closer in design to air capture systems than to typical industrial scrubbing systems normally used for capturing richer concentrations of carbon dioxide discharged from factory and power plant smokestacks. Additionally, an air capture system can only be viable if powered by non-$CO_2$ emitting sources to ensure that the air capture system is $CO_2$ negative.

Chemical absorption (also referred to as chemical scrubbing) is one of the primary processes envisioned for large-scale capture of $CO_2$ from power plant flue gases and is, subsequently, also being proposed in the literature (and also studied in the study) for capture of $CO_2$ from air. Note that the paper restricts its analysis to proposed processes that chemically remove $CO_2$ from the atmosphere. Using a five-part procedure, detailed in the report, the study analyzes each air capture process without regard for any particular technology.

The study report found that higher estimated costs than those published can be attributable to the following design trade-offs inherent in any $CO_2$ capture process based on traditional solvent/sorbent looping systems:
   To capture the same quantity of $CO_2$ as a flue-gas-capture plant, and assuming the same fractional $CO_2$ removal, an air capture plant would need to process 300 times the volume of gas.
   Given practical limits on gas velocities in traditional scrubbers, conventional scrubbers for air capture would need significantly greater cross-sectional areas.
   In a conventional point-source scrubbing system, the solvent or sorbent loading and regeneration must maintain the pace dictated by the flue-gas flow rates, whereas the air capture system flow requirements will be dictated by the desired capture rates.
   Without major design modifications from the conventional, the expense of blowing or fan power may drive the cost of such a plant far above the order of magnitude estimates of the current work.
   The driving force (i.e., the partial pressure of $CO_2$) for sorption in air capture absorbers is 300-fold less than in flue-gas absorbers, requiring much larger contact surface areas.

The study report concludes stating that, if the design and implementation of direct air capture plants were to move forward at the costs estimated in this work, they would have to be quite unique to the traditional gas scrubbing systems of point-source $CO_2$ emissions.

The study suggested an alternative indirect pathway for air capture that may ultimately offer a reasonable $CO_2$ offset, a biomass-based combustion power plant with $CO_2$ capture. $CO_2$ is captured from the air via photosynthesis and stored in the biomass, which is harvested and combusted to produce power. The relatively concentrated $CO_2$ in the flue gas (about 10%) is captured and stored. The net result is that solar energy is used to capture $CO_2$ from the air for storage in geologic reservoirs with production of $CO_2$-free electricity. Estimates for the total cost of capturing $CO_2$ from this process are in the range of $150-$400/t$CO_2$, depending on the amount of "fugitive" emissions that must be subtracted from the gross amount of $CO_2$ captured, ranging from 0 to 50% of the gross amount captured. An estimated 180,000 square miles of arable land (roughly 6% of the land area of the contiguous United States) will be required to capture one billion metric tons of $CO_2$ per year.

B. Article in Scientific America Provides Insights to the Findings of the PNAS Report As reported in the article in Scientific America entitled, "Scrubbing Carbon Dioxide from Air May Prove Too Costly," the following is based on an interview with two of the co-authors of the PNAS report:

Howard Herzog, a senior research engineer at the Massachusetts Institute of Technology's Energy Initiative Kurt Zenz House, President of C12 Energy, a carbon dioxide management firm The PNAS study report was initiated in response to the President's Science Adviser, John Holdren, and Energy Secretary, Steven Chu, who have previously expressed support for capturing and storing pollution from the air as a measure to mitigate global temperature increases. The study was conducted to validate whether or not this ideal and direct solution to climate change can efficiently capture greenhouse gases straight from the atmosphere. However, the study found that such a proposal is very far-fetched and tremendously expensive.

The following points denouncing air capture as a solution to climate change were extracted from the article:

1. The scientists conducting the study thought that air capture was shown to be largely wishful thinking that distracts from more effective strategies for combating pollution and climate change. "We thought it was important to set the record straight because [air capture] has policy implications," said Howard Herzog, a senior research engineer at the Massachusetts Institute of Technology's Energy Initiative and one of the report's authors. He said that air capture is appealing because it allows people to get away with not changing anything about their energy use.

2. Air capture involves using filters, chemical reactions, or special materials to collect greenhouse gases like carbon dioxide. Many of these technologies already exist for industrial use to keep carbon dioxide out of critical processes and to purify the air on spacecraft and submarines. The problem with using these tools to fight climate change is that pulling carbon dioxide out of the atmosphere is resource-intensive. "[Air capture] takes a lot of energy. The reason we have $CO_2$ emissions is because we use a lot of energy. Controlling $CO_2$ by burning a lot of energy doesn't make a lot of sense," Herzog said.

3. Another challenge for air capture is that the atmosphere blanketing the Earth's surface is very big, and carbon dioxide is a relatively small part of it. The scientists studied some of the existing air capture strategies on the market and calculated how efficient and how costly they would be in cleaning the air at large. "I suggested looking into what the efficiencies should be as a function of the dilution of the target materials," said Kurt Zenz House. He explained that the team examined how much energy it takes for carbon extraction systems to clean the air outdoors when the gas is spread out, unlike the richer concentrations in smokestacks for factories and coal power plants where carbon scrubbing systems are commonly advised. Collecting carbon dioxide from the atmosphere would require combing through 300 times as much air as you would need in a power plant. "It's harder to find a needle in large haystack than a small haystack," said House.

4. The researchers found that previous cost and efficiency estimates for air capture from entrepreneurs and scientists were far too optimistic. Extracting carbon dioxide from the air would likely cost more than $1,000 per ton, compared to $50 to $100 per ton from a system installed in a chimney. "We're not saying it's infeasible to take $CO_2$ out of the air; we're asking if this is an economic way to mitigate climate change, and here we're very clear it's not," said Herzog.

5. House also noted that the energy needed to pull a given quantity of carbon dioxide from the air is greater than the energy you get from burning the coal that produced it. In other words, running an air capture system with coal power would produce more pollution than it cleans up. "If you power it with natural gas, you break even, which is pointless," said House. The only way air capture would be effective in fighting climate change is if it were powered by renewable energy like solar or wind power, in which case, it is better to feed the energy back into the grid to displace fossil fuel generation, according to House. "For air capture to work, people would basically have to substantially improve on what we've achieved so far in commercial separation systems," he said.

6. There are other ways of capturing carbon:
    a. "Probably the most practical one is biological, like trees and vegetation. That's driven by solar energy. That's not inexpensive, but it's a lot more feasible [than air capture]," said Herzog, noting that using plants to control carbon emissions would require a significant amount of land.
    b. Another approach is to stop carbon at the source, using existing technologies to capture carbon dioxide from industrial sites, and either storing it underground or reusing it for manufacturing. There are already fossil fuel energy plants using these systems, but cost is still an issue. "It's in the same ballpark as large-scale renewables and nuclear power," said Herzog. "None of them are cheap compared to base systems."

C. Report by the American Physical Society (APS) Panel on Public Affairs (POPA)

A study report published for the American Physical Society (APS) Panel on Public Affairs (POPA), entitled, "Direct Air Capture of $CO_2$ with Chemicals: A Technology Assessment for the APS Panel on Public Affairs," is very similar to the article described above in the Proceedings of the National Academy of Sciences (PNAS) entitled, "Economic and Energetic Analysis of Capturing $CO_2$ from Ambient Air." One of the authors, Jennifer Wilcox, is listed in both.

The APS POPA report states in the Executive Summary the following:

Direst Air Capture (DAC) is one of a small number of strategies that might allow the world someday to lower the atmospheric concentration of $CO_2$. The wide-open science and engineering issues that will determine ultimate feasibility and competitiveness involve 1) alternative strategies for moving the air and 2) alternative chemical routes to sorption and regeneration.

Ultimate judgments about the future role for DAC and its future cost are necessarily constrained by the scarcity of experimental results for DAC systems. No demonstration or pilot-scale DAC system has yet been deployed anywhere on earth, and it is entirely possible that no DAC concept under discussion today or yet to be invented will actually succeed in practice. Nonetheless, DAC has entered policy discussions and deserves close analysis.

Key messages of the APS POPA report states that the implications of direct air capture (DAC) of $CO_2$ by chemicals for climate and energy policy are as follows:

DAC is not currently an economically viable approach to mitigating climate change.

In a world that still has centralized sources of carbon emissions, any future deployment that relies on low-carbon energy sources for powering DAC would usually be less cost-effective than simply using the low-carbon energy to displace those centralized carbon sources. Thus, coherent $CO_2$ mitigation postpones deployment of DAC until large, centralized $CO_2$ sources have been nearly eliminated on a global scale.

DAC may have a role to play eventually in countering emissions from some decentralized emissions of $CO_2$, such as from buildings and vehicles (ships, planes) that prove expensive to reduce by other means.

Given the large uncertainties in estimating the cost of DAC, century-scale economic models of global $CO_2$ emissions that feature "overshoot trajectories" and rely on DAC should be viewed with extreme caution.

High-carbon energy sources are not viable options for powering DAC systems, because their $CO_2$ emissions may exceed the $CO_2$ captured.

The storage part of $CO_2$ capture and storage (CCS) must be inexpensive and feasible at huge scale for DAC to be economically viable.

This report provides no support for arguments in favor of delay in dealing with climate change that are based on the availability of DAC as a compensating strategy.

The report states in the Preface the following:

This report explores one of the potential $CO_2$ removal strategies: direct air capture (DAC) of $CO_2$ with chemicals. The reader should imagine ambient air flowing over a chemical sorbent that selectively removes the $CO_2$, and then a subsequent step of desorption that regenerates the sorbent and provides a concentrated stream of $CO_2$ for disposal or reuse. The wide-open science and engineering issues involve 1) alternative strategies for moving the air and 2) alternative chemical routes to sorption and regeneration.

Human beings may wish to cancel some or all future fossil fuel emissions and even to undo past emissions. But wishing is not doing. Using chemicals to remove $CO_2$ directly from the air at large scale appears to be extremely difficult. The principal reason for this difficulty is that $CO_2$ is such a dilute constituent of air—only one molecule in 2500 in air is $CO_2$. Removal of $CO_2$ from air with chemicals is physically possible, but nonetheless, no large-scale system for direct capture with chemicals has yet been deployed anywhere on earth. Indeed, no such scheme has been yet subject to a thorough and wide-ranging evaluation.

V. Approach to Reducing Global Warming by the Climate Institute in Australia The following is from the website of The Climate Institute (www.climateinstitute.org.au).

The Climate Institute is an independent research organization in Australia and has been advocating the need for carbon-removal technologies since 2007. Their projects have been supported by the Global CCS Institute.

The Climate Institute has been examining the role of carbon-removal technologies in reducing global emissions below zero. Two public reports, as follows, have been developed by The Climate Institute describing their research projects:

"Below Zero, Carbon Removal and the Climate Challenge" is the first part of a project examining the role of carbon-removal technologies in reducing global emissions below zero. (The Climate Institute, www.climateinstitute.org.au)

"Moving Below Zero: Understanding Bioenergy with Carbon Capture & Storage," is the second part of a project examining the role of carbon-removal technologies in reducing global emissions below zero. (The Climate Institute, www.climateinstitute.org.au)

Four key carbon-removal technologies of removing carbon dioxide from the atmosphere endorsed by The Climate Institute in their "Below Zero" report (referenced above) are as follows:

Bio-energy with carbon capture and storage (BECC)

Bio-CCS (also known as renewable-CCS) involves the combination of two well-known technologies: bio-energy and carbon capture and storage (CCS). Biomass has been burned for thousands of years for cooking, and more recently in power stations to generate bio-energy, heat, electricity, and transport fuels. Rather than allowing the gases to carry the $CO_2$ back into the air, CCS can be fitted, removing the $CO_2$ and storing it in geological rock formations (over 0.8 km deep).

Bio-char production

Bio-char, a charcoal-like material, is created by heating biomass in a low-oxygen environment. It results in fixing the carbon into the bio-char, preventing it from decomposing and returning to the air. Bio-char can be mixed into farmlands to improve the soil condition, enhancing water retention and recycling vital nutrients. In turn, this improves plant growth; taking in more $CO_2$ and in some cases can replace fossil-based fertilisers. The process has been under trial since it was discovered from ancient Amazonian farming practices, where soil has retained carbon since around AD 450. Bio-char's resilience to decomposition is variable. A large portion of the carbon is stable over the time frame of 100-1,000 years.

Afforestation (planting new forests)

Creating new plantation forests will absorb carbon, at least up to a certain threshold. This allows new tree growth, thus continuing the process of carbon removal.

Wood storage

To ensure carbon continues to be removed, some wood can be harvested from plantation forests and used in construction, which locks up the carbon for decades.

VI. The Virgin Earth Challenge

The following is from an article in the website of *Wikipedia, the free encyclopedia*, entitled, "*Virgin Earth Challenge*" (http://en.wikipedia.org/wiki/Virgin_Earth_Challenge).

The Virgin Earth Challenge is a competition offering a $25 million prize for whoever can demonstrate a commercially viable design that results in the permanent removal of greenhouse gases out of the Earth's atmosphere to contribute materially in global warming avoidance. The prize was conceived and financed by Sir Richard Branson, a successful British entrepreneur, and was announced in London on 9 Feb. 2007 by Branson and former US Vice President and 2007 Nobel Prize winner Al Gore, creator of the 2006 film An Inconvenient Truth on climate change.

Among more than 2600 applications, 11 finalists were announced on Nov. 2, 2011 as follows:

Biochar Solutions, from the US
Biorecro, Sweden
Black Carbon, Denmark
Carbon Engineering, Canada Climeworks, Switzerland
COAWAY, US
Full Circle Biochar, US
Global Thermostat, US
Kilimanjaro Energy, US
Smartstones—Olivine Foundation, Netherlands
The Savory Institute, US A. The Challenge The Prize will be awarded to "a commercially viable design, which achieves or appears capable of achieving the net removal of significant volumes of anthropogenic, atmospheric GHGs each year for at least 10 years," with significant volumes specified as "should be scalable to a significant size in order to meet the informal removal target of 1 billion tonnes of carbon-equivalent per year." It should be noted that one tonne of carbon-equivalent (C) equals 3.67 tonnes of carbon dioxide ($CO_2$) because of the relationship between their atomic weights, more precisely 44/12. At present, fossil fuel emissions are around 6.3 gigatons of carbon.

The prize will initially only be open for five years, with ideas assessed by a panel of judges including Richard Branson, Al Gore, and Crispin Tickell (British diplomat), as well as scientists James E. Hansen, James Lovelock, and Tim Flannery. If the prize remains unclaimed at the end of five years, the panel may elect to extend the period.

Around two hundred billion metric tons of carbon dioxide have accumulated in the atmosphere since the beginning of the industrial revolution, raising concentrations by more than 100 parts per million (ppm), from 280 to more than 380 ppm. The Virgin Earth Challenge is intended to inspire inventors to find ways of bringing that back down again to avoid the dangerous levels of global warming and sea level rise predicted by organisations such as the Intergovernmental Panel on Climate Change.

The Virgin Earth Challenge is similar in concept to other high technology competitions, such as the Orteig Prize for flying across the Atlantic and the Ansari X Prize for spaceflight.

B. Competing Technologies

The eleven finalists represent five competing technologies, some being represented by multiple finalists.

Biochar

Biochar is created by pyrolysis of biomass. Pyrolysis is a process where biomass is partially combusted in an oxygen-limited environment, which produces a char rich in carbon. This char can be distributed in soils as a soil amendment.

The Finalists included in the biochar category are as follows:
  Biochar Solutions located in the USA
  Black Carbon located in Denmark
  Full Circle Biochar located in the USA BECCS (Bio-Energy with Carbon Capture and Storage)

Bio-energy with carbon capture and storage (BECCS) combines combustion or processing of biomass with geologic carbon capture and storage. BECCS is applied to industries such as electrical power, combined heat and power, pulp and paper, ethanol production, and biogas production.

There is 550 000 tonnes $CO_2$/year in total BECCS capacity operating, divided between three different facilities (as of January 2012).

BECCS was pointed out in the IPCC Fourth Assessment Report by the Intergovernmental Panel on Climate Change (IPCC) as a key technology for reaching low carbon dioxide atmospheric concentration targets. The negative emissions that can be produced by BECCS has been estimated by the Royal Society to be equivalent to a 50 to 150 ppm decrease in global atmospheric carbon dioxide concentrations and, according to the International Energy Agency, the BLUE map climate change mitigation scenario calls for more than 2 gigatonnes of negative $CO_2$ emissions per year with BECCS in 2050. According to the OECD, "Achieving lower concentration targets (450 ppm) depends significantly on the use of BECCS."

The sustainable technical potential for net negative emissions with BECCS has been estimated to 10 Gt of $CO_2$ equivalent annually, with an economic potential of up to 3.5 Gt of $CO_2$ equivalent annually at a cost of less than 50 €/tonne, and up to 3.9 Gt of $CO_2$ equivalent annually at a cost of less than 100 €/tonne.

Imperial College London, the UK Met Office Hadley Centre for Climate Prediction and Research, the Tyndall Centre for Climate Change Research, the Walker Institute for Climate System Research, and the Grantham Institute for Climate Change issued a joint report on carbon dioxide removal technologies as part of the AVOID:

Avoiding dangerous climate change research program, stating that "Overall, of the technologies studied in this report, BECCS has the greatest maturity and there are no major practical barriers to its introduction into today's energy system. The presence of a primary product will support early deployment."

The Finalist included in the BECCS category is Biorecro located in Sweden.

Direct Air Capture

Direct Air Capture is the process of capturing carbon dioxide directly from ambient air using solvents, filters, or other methods. Subsequent to being captured, the carbon dioxide would be stored with carbon capture and storage technologies to keep it permanently out of the atmosphere.

The Finalists included in the direct air capture category are as follows:
  Carbon Engineering located in Canada
  Climeworks located in Switzerland
  Coaway located in the USA
  Global Thermostat located in the USA
  Kilimanjaro Energy located in the USA Enhanced Weathering Enhanced weathering refers to a chemical approach to in-situ carbonation of silicates, where carbon dioxide is combined through natural weathering processes with mined minerals, such as olivine.

The Finalist included in the enhanced weathering category is the Smartstones-Olivine Foundation located in The Netherlands.

Grassland Restoration

Changed management methods for grasslands can significantly increase the uptake of carbon dioxide into the soil, creating a carbon sink. This and other land use change methods is not generally considered among negative emission technologies because of uncertain long-term sequestration permanence.

The Finalist included in the grassland restoration category is The Savory Institute located in the USA.

VII. Pertinent Prior Art Concerning the Extraction of Carbon Dioxide from Air

Pertinent prior art concerning the extraction of carbon dioxide from air were found in U.S. Patents granted to three companies as follows:
  Klaus S. Lackner, et al. with Kilimanjaro Energy, Inc. (Formerly Global Research Technologies, Llc) and The Trustees of Columbia University in the City of New York
  David Keith, et al. with Carbon Engineering, Ltd.

Peter Eisenberger and Graciela Chichilnisky with Global Thermostat

Background of the Companies

The following is from an article in the website of Marc Gunter entitled, "*Kilimanjaro Energy: towering ambitions*," Feb. 27, 2011(http://www.marcgunther.com/kilimanjaro-energy-towering-ambitions/).

"Kilimanjaro Energy is one of a handful of startups working on technologies to efficiently remove $CO_2$ from the atmosphere. The others are Global Thermostat, and Carbon Engineering. All three have their roots in academia, and each is pursuing its own technology for $CO_2$ capture. The oldest of the trio, Kilimanjaro Energy, which was formerly known as Global Research Technologies, was started in 2004 by Klaus S. Lackner, a brilliant physicist who is a professor at Columbia University's School of Engineering and Applied Science and a pioneer in the world of $CO_2$ capture from the air. It was funded in its early years by the late Gary Comer, the founder of Land's End and a well-known philanthropist."

The Patent Search showed results in the following areas: Klaus S. Lackner, et al. With Kilimanjaro Energy, Inc. (Formerly Global Research Technologies, Llc) and the Trustees of Columbia University Six U.S. Patents were granted to Klaus Lackner, et al. Three of the six U.S. Patents are entitled, "Removal of carbon dioxide from air." The remaining three U.S. Patents are entitled, "Method and Apparatus for Extracting Carbon Dioxide from Air," "Laminar scrubber apparatus for capturing carbon dioxide from air and methods of use," and "Systems and methods for extraction of carbon dioxide from air." Patentees listed are Global Research Technologies, Llc, Kilimanjaro Energy, Inc., and The Trustees of Columbia University in the City of New York.

Klaus Lackner is a Professor at Arizona State University and a Director of The Center for Negative Carbon Emissions, Arizona State University. Before this, he was a Professor at Columbia University and, previous to this, worked in the Theoretical Division of the Los Alamos National Laboratory.

The following is from Earth Island Journal entitled, "*Passive Carbon Capture Can Clean Up Our Air, But the Technology Lacks Popular Support*," Aug. 25, 2014 (http://www.earthisland.org/journal/index.php/elist/eListRead/passive_carbon_capture_can_clean_up_our_air_but_the_technology_lacks_/):

"[S]ome scientists have demonstrated that carbon can be passively removed from the air without creating further emissions. Klaus Lackner, a geophysics professor at Columbia University, and his team have developed a "fake tree" carbon collector. An early effort used plastic "leaves" coated in resin that traps carbon particles in the air. The newer passive carbon-capture devices look more like furnace filters with straw-like tubes dotted with holes, packed closely together inside a metal frame. The devices necessary to collect one ton of carbon per day would fit into a standard shipping container that, once opened, would require approximately 60 square meters of area. Set up in a location facing into a slow wind, the devices would come into contact with carbon in the air. A faster wind would mean a greater amount of carbon would be captured more quickly. Because no power source is needed, no new carbon emissions are created."

David Keith, et al. with Carbon Engineering, Ltd.

U.S. Patents were granted to David Keith, et al., two of which are entitled "Carbon dioxide capture" and "Target gas capture."

David Keith, Ph.D., is the Executive Chairman of Carbon Engineering Ltd. The following is stated from the company's website, http://carbonengineering.com/about-ce/:

"We have developed, patented, and prototyped a unique contactor design that maximizes $CO_2$ absorption by utilizing a large solution surface area, optimized air turbulence and mixing, and solution-refresh rates. Our contactor design enables us to capture industrial-scale quantities of $CO_2$ using a cost-effective device with low solution pumping and fan energy inputs, and with minimal land use requirements. Our prototype air contactor was 12' tall and 40' long, during summer/fall 2011 we commissioned and during summer/fall 2012 it captured 2 tonnes of $CO_2$ from the air without a single breakdown. Both the potassium hydroxide [KOH] reactant used in our air contactor and the produced potassium carbonate [$K_2CO_3$] are non-toxic, and are in fact used at low concentrations in the preparation of certain foods."

Peter Eisenberger and Graciela Chichilnisky with Global Thermostat

A U.S. Patent was granted to Peter Eisenberger, Chief Technology Officer and Co-Founder, and Graciela Chichilnisky, Chief Executive Officer and Co-Founder, of Global Thermostat (GT) entitled "System and method for removing carbon dioxide from an atmosphere and global thermostat using the same." The following is stated from the company's website, http://globalthermostat.com/who-we-are/about-global-thermostat/:

"GT uses custom equipment and proprietary (dry) amine-based chemical "sorbents" bonded to porous honeycomb ceramic "monoliths" that together act as carbon sponges, efficiently adsorbing $CO_2$ directly from the atmosphere, from smokestacks, or from a combination of both. The captured $CO_2$ is stripped off and collected using low-temperature steam (85-100° C.) ideally sourced from residual/process heat at low- or no-cost. The output is 98% pure $CO_2$ at standard temperature & pressure. Nothing but steam and electricity is consumed, and no other effluents or emissions are created. The entire process is mild, safe, and carbon negative."

Patents granted to the above listed companies are summarized below.

A. Klaus S. Lackner, et al. with Kilimanjaro Energy, Inc. (Formerly Global Research Technologies, Llc) and the Trustees of Columbia University

| Patent Title: Removal of carbon dioxide from air | | | | | |
|---|---|---|---|---|---|
| Country Code | Publication Number | Kind Code | Publication Date | Applicant | Patentee |
| US | 7,655,069 | B2 | Feb. 2, 2010 | Allen B. Wright Klaus S. Lackner Eddy J. Peters | Global Research Technologies, Llc |

Abstract:

An air/liquid exchanger comprising an open-cell foam supporting a liquid sorbent. The exchanger may be used for removing trace gaseous components from the air.

From the Summary of the Invention:

The present invention employs as an air/liquid exchange open cell foams. Open-cell foams readily can retain fluids that fill the available foam space. Macroscopic surfaces of the foam block structure are then exposed to the air (or other gas) that is to be brought in contact with the fluid.

Macroscopic surfaces represent the gas-foam interface, these surface structures are large compared to the size of foam cells and define the boundaries of the foam block structure. They delineate the boundary between the inside and the outside of the foam, these surfaces can have complicated topological structures if gas flow channels are designed to cross through the foam.

Flows induced within the open cell structure allow for the continued transport of fluid through the foam's interior which leads to the replacement of spent fluid on the air-foam interface with fresh fluid. The exterior or interior macroscopic surfaces of the foam structure represent the approximate gas-liquid interface

| Patent Title: Method and Apparatus for Extracting Carbon Dioxide from Air | | | | | |
|---|---|---|---|---|---|
| Country Code | Publication Number | Kind Code | Publication Date | Applicant | Patentee |
| US | 7,708,806 | B2 | May 4, 2010 | Allen B. Wright Klaus S. Lackner Ursula Ginster | Global Research Technologies, Llc. |

Abstract:

A method and apparatus for extracting $CO_2$ from air comprising an anion exchange material formed in a matrix exposed to a flow of the air, and for delivering that extracted $CO_2$ to controlled environments. The present invention contemplates the extraction of $CO_2$ from air using conventional extraction methods or by using one of the extraction methods disclosed; e.g., humidity swing or electro dialysis. The present invention also provides delivery of the $CO_2$ to greenhouses where increased levels of $CO_2$ will improve conditions for growth. Alternatively, the $CO_2$ is fed to an algae culture.

From the Summary of the Invention:

In a first exemplary embodiment, the present invention extracts $CO_2$ from ambient air and delivers the extracted $CO_2$ to a greenhouse. Preferably, the $CO_2$ is extracted from ambient air using a strong base ion exchange resin that has a strong humidity function, that is to say, an ion exchange resin having the ability to take up $CO_2$ as humidity is decreased, and give up $CO_2$ as humidity is increased.

In a second exemplary embodiment, this invention allows the transfer of $CO_2$ from a collector medium into an algae culture, where the $CO_2$ carbon is fixed in biomass.

Accordingly, in broad concept, the present invention extracts $CO_2$ from ambient air using one of several $CO_2$ extraction techniques. Where a carbonate/bicarbonate solution is employed as the primary $CO_2$ sorbent, the $CO_2$ bearing sorbent may be used directly as a feed to the algae. Where the $CO_2$ is extracted using an ion exchange resin, the $CO_2$ is stripped from the resin using a secondary carbonate/bicarbonate wash which then is employed as a feed to the algae. In a preferred alternative embodiment, the carbonate is fed to the algae in a light enhanced bioreactor.

| Patent Title: Laminar scrubber apparatus for capturing carbon dioxide from air and methods of use | | | | | |
|---|---|---|---|---|---|
| Country Code | Publication Number | Kind Code | Publication Date | Applicant | Patentee |
| US | 7833328 | B2 | Nov. 16, 2010 | Klaus Lackner Allen Wright | The Trustees of Columbia University in the City of New York, Kilimanjaro Energy, Inc. |

Abstract:

The present invention is directed to methods for carbon dioxide from air, which comprises exposing solvent covered surfaces to air streams where the airflow is kept laminar, or close to the laminar regime. The invention also provides for an apparatus, which is a laminar scrubber, comprising solvent covered surfaces situated such that they can be exposed to air streams such that the airflow is kept laminar.

From the Summary of the Invention:

The present invention is directed to methods for removing carbon dioxide from air, which comprises exposing solvent covered surfaces to air streams where the airflow is kept laminar, or close to the laminar regime. The invention also provides for an apparatus which is a laminar scrubber, comprising solvent covered surfaces situated such that they can be exposed to air streams such that the airflow is kept laminar.

Efficient capture of carbon dioxide from air requires a sorbent that can absorb $CO_2$ with minimum energy costs. Processes that heat or cool the air, or that change the pressure of the air by substantial amounts will be energetically disadvantaged.

The apparatus consists of a scrubber design which provides essentially straight flow paths for the air that is blowing through the device. Sorbent covered surfaces are within millimeters to centimeters of the flow path of every air parcel. The simplest embodiment is a set of flat plates with the air moving through the gaps between the plates and the sorbent flowing over the surfaces.

| Patent Title: Removal of carbon dioxide from air | | | | | |
|---|---|---|---|---|---|
| Country Code | Publication Number | Kind Code | Publication Date | Applicant | Patentee |
| US | 8088197 | B2 | Jan. 3, 2012 | Allen Wright Klaus Lackner, et al. | Kilimanjaro Energy, Inc. |

Abstract:

The present invention is directed to methods for removing $CO_2$ from air, which comprises exposing sorbent covered surfaces to the air. The invention also provides for an apparatus for exposing air to a $CO_2$ sorbent. In another aspect, the invention provides a method and apparatus for separating carbon dioxide ($CO_2$) bound in a sorbent.

From the Summary of the Invention:

In one embodiment, there is provided an ion exchange material to capture or absorb $CO_2$. In one aspect, the invention employs a solid anionic exchange membrane as the primary $CO_2$ capture matrix. The ion exchange material may comprise a solid matrix formed of or coated with an ion exchange material. Alternatively, the material may comprise a cellulose based matrix coated with an ion exchange material.

Another embodiment employs a wetted foam air exchanger that uses a sodium or potassium carbonate solution, or other weak carbon dioxide sorbent, to absorb carbon dioxide from the air to form a sodium or potassium bicarbonate. The resulting sodium or potassium bicarbonate is then treated to refresh the carbonate sorbent which may be recovered and disposed of while the sorbent is recycled.

In another embodiment, carbon dioxide is removed from the air using an ion exchange material which is regenerated using a liquid amine solution which is then recovered by passing the amine solution into an electrodialysis cell.

In still yet another aspect of the invention, carbon dioxide is removed from the air by modifying the alkalinity of seawater which in turn increases the flux of carbon dioxide from the atmosphere into the water.

| Patent Title: Removal of carbon dioxide from air | | | | | |
|---|---|---|---|---|---|
| Country Code | Publication Number | Kind Code | Publication Date | Applicant | Patentee |
| US | 8133305 | B2 | Mar. 13, 2012 | Klaus Lackner Allen Wright | Kilimanjaro Energy, Inc. |

Abstract:

The present invention provides a method and apparatus for removing a contaminant, such as carbon dioxide, from a gas stream, such as ambient air. The contaminant is removed from the gas stream by a sorbent, which may be regenerated using a humidity swing, a thermal swing, or a combination thereof. The sorbent may be a substrate having embedded positive ions and individually mobile negative ions wherein the positive ions are sufficiently spaced to prevent interactions between the negative ions. Where a thermal swing is used, heat may be conserved by employing a heat exchanger to transfer heat from the regenerated sorbent to an amount of sorbent that is loaded with the contaminant prior to regeneration.

From the Summary of the Invention:
  The art has proposed various schemes for removal of $CO_2$ from combustion exhaust gases or directly from the air by subjecting the gases or air to a pressure swing or a thermal swing using a $CO_2$ adsorbent. Different sorbent materials are disclosed, including zeolites, amines, and activated alumina.
  [T]he invention provides a method and apparatus for removing a contaminant from a gas stream by utilizing a sorbent that captures the contaminant, such as carbon dioxide ($CO_2$) when it is sufficiently dry and releases the contaminant to a contained atmosphere when the sorbent is exposed to water or humidity.

The invention therefore provides a sorbent that absorbs a gas, such as $CO_2$, under controlled temperatures, and will load itself fully or partially with the gas it is absorbing. The sorbent is recovered at an elevated temperature, the goal of this invention being to provide the heat necessary to drive the sorbent to the higher temperature.

| Patent Title: Systems and methods for extraction of carbon dioxide from air | | | | | |
|---|---|---|---|---|---|
| Country Code | Publication Number | Kind Code | Publication Date | Applicant | Patentee |
| US | 8702847 | B2 | Apr. 22, 2014 | Klaus S. Lackner Frank S. Zeman | |

Abstract:

The present invention describes methods and systems for extracting, capturing, reducing, storing, sequestering, or disposing of carbon dioxide ($CO_2$), particularly from the air. The $CO_2$ extraction methods and systems involve the use of chemical processes. Methods are also described for extracting and/or capturing $CO_2$ via exposing air containing carbon dioxide to a solution comprising a base—resulting in a basic solution which absorbs carbon dioxide and produces a carbonate solution. The solution is causticized and the temperature is increased to release carbon dioxide, followed by hydration of solid components to regenerate the base.

From the Summary of the Invention:
  It is a general aspect of the present invention to provide new methods or processes for extracting, reducing, capturing, disposing of, sequestering, or storing $CO_2$ or removing excess $CO_2$ from the air, as well as new methods and processes for reducing, alleviating, or eliminating $CO_2$ in the air, and/or the emissions of $CO_2$ to the air. Another aspect of the invention relates to apparatuses, such as wind or air capture systems, to remove or extract $CO_2$ from air.
  One approach of managing atmospheric emissions is through a chemical process known as air extraction, by which $CO_2$ is removed directly from the atmosphere. This can be accomplished using wet scrubbing techniques to extract $CO_2$ from air then return the $CO_2$ to a gaseous form after several chemical transformations. The wet scrubbing is accomplished by contacting a sodium hydroxide solution with the atmosphere. The chemical absorption of $CO_2$ produces a solution of sodium carbonate, which is then causticized using calcium hydroxide.

B. David Keith, et al. with Carbon Engineering, Ltd.

| Patent Title: Carbon dioxide capture | | | | | |
|---|---|---|---|---|---|
| Country Code | Publication Number | Kind Code | Publication Date | Applicant | Patentee |
| US | 8119091 | B2 | Feb. 21, 2012 | David Keith Maryam Mahmoudkhani | Carbon Engineering Limited Partnership |

Abstract:

A method of carbon dioxide capture is disclosed. In a step (a) anhydrous sodium carbonate is separated from a first aqueous solution formed by reacting carbon dioxide and an aqueous solution of sodium hydroxide. In step (b) the anhydrous sodium carbonate is treated by causticization to generate carbon dioxide and sodium hydroxide. The first aqueous solution of step (a) is formed by scrubbing a gas containing carbon dioxide with an aqueous solution of sodium hydroxide.

From the Summary of the Invention:

Disclosed herein is a novel technique for recovering of sodium hydroxide from an aqueous alkaline solution of sodium carbonate. In the first step, anhydrous sodium carbonate is separated from the concentrated sodium hydroxide solution using a two-step precipitation and crystallization process.

The anhydrous sodium carbonate is then causticized using sodium tri-titanate. In the causticization process, sodium hydroxide is regenerated and carbon dioxide is liberated as a pure stream, which is compressed for use or disposal. The technique requires ~50% less high-grade heat than conventional causticization and the maximum temperature required is reduced by at least 50° C. This titanate process may allow a substantial reduction in the overall cost of direct air capture.

| Patent Title: Target gas capture | | | | | |
|---|---|---|---|---|---|
| Country Code | Publication Number | Kind Code | Publication Date | Applicant | Patentee |
| US | 8871008 | B2 | Oct. 28, 2014 | Matthew Henderson David Keith, et al. | Carbon Engineering Limited Partnership |

Abstract:

Capturing a target gas includes contacting a gas mixture including a target species with an aqueous solution including a buffer species, and transferring some of the target species from the gas mixture to the aqueous solution. The target species forms a dissolved target species in the aqueous solution, and the aqueous solution is processed to yield a first aqueous stream and a second aqueous stream, where the equilibrium partial pressure of the target species over the second aqueous stream exceeds the equilibrium partial pressure of the target species over the first aqueous stream. At least some of the dissolved target species in the second aqueous stream is converted to the target species, and the target species is liberated from the second aqueous stream. The target species can be collected and/or compressed for subsequent processing or use.

From the Summary of the Invention:

As described, a first gaseous stream having an initial concentration of a target species is processed to yield a second gaseous stream having a concentration of the target species that exceeds the concentration of the target species in the first gaseous stream.

This target gas enrichment process can be used with various target species including, for example, carbon dioxide found in atmospheric air and/or flue gas streams from fossil fuel combustion power generation systems. Advantages of this target gas enrichment process include, for example, economical enrichment of target gas species from dilute gaseous streams.

C. Peter Eisenberger and Graciela Chichilnisky with Global Thermostat

| Patent Title: System and method for removing carbon dioxide from an atmosphere and global thermostat using the same | | | | | |
|---|---|---|---|---|---|
| Country Code | Publication Number | Kind Code | Publication Date | Applicant | Patentee |
| US | 8894747 | B2 | Nov. 25, 2014 | Peter Eisenberger Graciela Chichilnisky | |

Abstract:

A system for removing carbon dioxide from an atmosphere to reduce global warming including an air extraction system that collects carbon dioxide from the atmosphere through a medium and removes carbon dioxide from the medium; a sequestration system that isolates the removed carbon dioxide to a location for at least one of storage and which can increase availability of renewable energy or non-fuel products such as fertilizers and construction materials; and one or more energy sources that supply process heat to the air extraction system to remove the carbon dioxide from the medium and which can regenerate it for continued use.

From the Patent Description:

Applicants' preferred concept for extracting carbon dioxide from the atmosphere comprises using a relatively thin, large surface area substrate with a medium (e.g. an amine) that removes carbon dioxide from the atmosphere and using process heat to remove carbon dioxide from the medium.

Using a relatively large area substrate perpendicular to the direction of air flow is particularly useful, because of the relatively low concentration of carbon dioxide in the atmosphere (as opposed to the relatively high concentration that would normally be found, e.g. in flue gases).

VIII. Pertinent Prior Art Concerning Carbon Dioxide Extraction from Air Based on Henry's Gas Law of Solubility of Carbon Dioxide in Water Pertinent prior art concerning carbon dioxide extraction from air based on Henry's Gas Law of Solubility of carbon dioxide in water was found in patent applications from the following:

Svein Knudsen and Norbert Schmidbauer from the Norsk Institutt for Luftforskning A U.S. Patent Application was submitted by Svein Knudsen and Norbert Schmidbauer from the Norsk Institutt for Luftforskning entitled, "Method and System for Gas Capture."

Gerald C. Blount of the Savannah River Nuclear Solutions, LLC

A U.S. Patent Application was submitted by Gerald C. Blout of the Savannah River Nuclear Solutions, LLC entitled "Mass Transfer Apparatus and Method for Separation of Gases."

Patent Applications from the above listed companies are summarized below.

A. Svein Knudsen and Norbert Schmidbauer from Norsk Institutt for Luftforskning

| Patent Title: Method and System for Gas Capture | | | | | |
|---|---|---|---|---|---|
| Country Code | Publication Number | Kind Code | Publication Date | Applicant | Patentee |
| US | 20120111189 | A1 | May. 10, 2012 | Svein Knudsen Norbert Schmidbauer | Norsk Institutt for Luftforskning |

Abstract:

Method and system to capture target gases from all kind of point-sources, as well as from ambient air and surface waters, sediments or soils by advantage of large differences in Henrys law constants. For gas dissolution in water the constants favor dissolution of e.g. $CO_2$ compared to the main constituents of flue gases like $N_2$ and $O_2$. The main principle is to dissolve the gases—release of the non-dissolved part stripping the liquid for the dissolved gases, which are enriched in target gas. Further steps can be used to reach a predetermined level of target gas concentration.

From the Summary of the Invention:

The invention is a method and a system for capturing and concentrating a target gas present in a flue gas mixture, or in the air.

The gas mixture is introduced into a liquid having higher solubility for the target gas than for other gases present in the gas mixture, then dissolved gases are released from the liquid, the released gases will constitute a new gas mixture.

This new gas mixture is introduced into a container comprising a liquid having higher solubility for the target gas than for other gases present in the new gas mixture, and then the steps are repeated until a concentration of the target gas in the new gas mixture is at a predetermined level in the liquid.

Also from the Summary of the Invention, the main principle of the process is:

Effective contact between gas and water, such as by streaming bubbles or small bubbles created by cavitation improving the speed and efficiency of gas absorption, turbulence devices. In some of the applications, spray absorption or large wetted surface areas could be applied in addition.

Release of non-dissolved gas; this gas mixture could be used in further steps.

Stripping of the dissolved gases from the water, e.g., by lowering the partial pressure, use of sub-ambient pressure, use of ultra-sonic devices and offering large surfaces like raschig rings or nano-surfaces or nano-particles. The speed of the out-gassing due to lowering the partial pressure will follow different rates. In the case of water exposed to air, $N_2$ will outgas faster than $O_2$ and $O_2$ faster than $CO_2$. This process can be utilized in order to enhance the target gas concentration further.

As stated in the Summary of the Invention, some of the advantages of the present invention are:

$CO_2$ can be captured either directly from air or water (oceans, surface waters) or from flue gas from industrial processes such as large point sources, fossil fuel or biomass energy facilities, [and] industries with major $CO_2$ emissions [such as] cement plants, refineries, natural gas processing [plants], synthetic fuel plants, energy production [plants using] fossil fuel, and hydrogen production plants.

$CO_2$ can be captured from large mobile vehicles such as ships or trucks.

$CO_2$ produced in landfills, composting or fermentation processes, can be captured either from the gas-phase or the effluent water.

$CO_2$ can also be captured from ventilation systems in road tunnels or buildings [such as] parking garages or skyscrapers.

B. Gerald C. Blount of Savannah River Nuclear Solutions, LLC

| Patent Title: Mass Transfer Apparatus and Method for Separation of Gases | | | | | |
|---|---|---|---|---|---|
| Country Code | Publication Number | Kind Code | Publication Date | Applicant | Patentee |
| US | 20150075375 | A1 | Mar. 19, 2015 | Gerald C. Blout | Savannah River Nuclear Solutions, LLC |
| WO | 2015/039066 | | Mar. 19, 2015 | | |

Abstract:

A process and apparatus for separating components of a source gas is provided in which more soluble components of the source gas are dissolved in an aqueous solvent at high pressure. The system can utilize hydrostatic pressure to increase solubility of the components of the source gas. The apparatus includes gas recycle throughout multiple mass transfer stages to improve mass transfer of the targeted components from the liquid to gas phase. Separated components can be recovered for use in a value added application or can be processed for long-term storage, for instance in an underwater reservoir.

From the Background of the Patent Application:

The recovery of off-gases from manufacturing and processing plants can decrease detrimental effects of industry on both the environment and individuals. Moreover, recovered gases can often add value as a fuel or as a raw material in another process.

Current understanding of the climate affects caused by release of carbon dioxide into the atmosphere has led to the attempts to store or use recovered carbon dioxide rather than simply release it [into the atmosphere].

Accordingly, what are needed in the art are methods and apparatuses that can efficiently recover gases such as carbon dioxide. Moreover, methods and devices that are cost effective and require only low energy input with wide geographic placement potential would be of great benefit.

BRIEF SUMMARY OF THE INVENTION

Two processes are proposed for removing carbon dioxide from air and enriching the carbon dioxide to a quality sufficient for sequestration using water:
1. Direct carbon dioxide capture from air using water
2. Indirect carbon dioxide capture from air using water in equilibrium with air Both $CO_2$ Capture Processes employ another process, the Carbon Dioxide Separation and Enrichment Process, again using water, to simultaneously separate carbon dioxide from air and enrich it to a high enough purity for sequestration.

The difference between the two proposed processes is the manner in which carbon dioxide is originally transferred from the air to the water as described below:
1. In the Direct Carbon Dioxide Capture Process, water is aerated with compressed air in an aerator where the carbon dioxide and other atmospheric gases in the air are easily dissolved in the water at the higher pressure. The water is subsequently deaerated at atmospheric pressure in a deaerator to remove these dissolved gases, which are then compressed for processing in the Carbon Dioxide Separation and Enrichment Process.
2. In the Indirect Carbon Dioxide Capture Process, the "aerated" water is natural water in equilibrium with the air that already contains carbon dioxide and other atmospheric gases dissolved from the air. The natural water need only be deaerated under vacuum to remove these dissolved gases, which are then compressed for processing in the Carbon Dioxide Separation and Enrichment Process.

The natural water used in the Indirect Carbon Dioxide Capture Process can be any natural water that contains free carbon dioxide in equilibrium with the atmosphere. The following should be considered when selecting suitable water for carbon dioxide capture:
1. The natural water should be optimum for dissolving atmospheric carbon dioxide in its free state without it binding with other ions in the water.
2. Because the solubility of gases increases with decreasing water temperature and decreases with increasing water salinity, the water should be as cold and as fresh as possible.
3. As the goal is to remove carbon dioxide from the atmosphere, the water should equilibrate with the atmosphere soon after deaerating it.

The Carbon Dioxide Separation and Enrichment ($CO_2$ S&E) Process involves multiple aeration/deaeration stages in series that take atmospheric gases from either the Direct Carbon Dioxide Capture Process or the Indirect Carbon Dioxide Capture Process and process them to separate and enrich the carbon dioxide from the other atmospheric gases. The atmospheric gases flow consecutively through each of the $CO_2$ S&E Stages where the atmospheric gases are initially dissolved in water in each of the stage's Aerators and then subsequently stripped from the water in each of the stage's Deaerators.

A brief description of the $CO_2$ S&E Process to capture carbon dioxide for sequestration is described below:
1. Stripped atmospheric gases from the Water Deaerator (in the Direct Process) or the Natural Water Deaerator (in the Indirect Process) are compressed to a suitable high pressure for water aeration in the Aerator of the initial $CO_2$ S&E Stage.
2. Within each $CO_2$ S&E Stage, carbon dioxide gas and some of the other atmospheric gases are dissolved in water at the suitable high pressure in the stage's Aerator. The dissolved gases are then subsequently stripped from the water at a lower pressure in the stage's Deaerator. The water is pumped in a continuous recycle loop within each $CO_2$ S&E Stage between the stage's Deaerator and the stage's Aerator.
3. The gases from the Deaerators in the initial $CO_2$ S&E Stages are compressed to a suitable high pressure for water aeration in the Aerators in subsequent $CO_2$ S&E Stages. The gases that are rich in carbon dioxide from the Deaerator in the last $CO_2$ S&E Stage are compressed to a suitable high pressure for $CO_2$ sequestration.
4. Atmospheric gases not dissolved in the water (after all the $CO_2$ had been dissolved) are released to the atmosphere or are used for reaeration of the deaerated natural water before it is discharged back into the environment.

The Direct and Indirect Carbon Dioxide Capture Process Facilities:
Are not unduly complicated or complex to operate or control.
Are simple to build, operate, and maintain.
Require minimal support personnel and associated support facilities.

The positive design features of the Direct Carbon Dioxide Capture Process and the Indirect Carbon Dioxide Capture Process over other processes that claim to remove carbon dioxide from air are as follows:
Only water and power are required.
No chemicals are required.
No regeneration of absorbent or adsorbent is required.
No heat is required.
No or minimal impact to the environment.

The negative design features of these two processes are as follows:
For the Direct Carbon Dioxide Capture Process, solar power is recommended to operate the air compressors due to the substantial amount of power required; however, solar power requirements can be minimized with the use of gas expanders that can generate electricity while depressurizing the "spent" air after removal of carbon dioxide in the aeration stage.
For the Indirect Carbon Dioxide Capture Process, solar power is recommended to operate the natural water pumps; however, as considerably less power is required, conventional power may be acceptable.
For the Direct Carbon Dioxide Capture Process, air cooling is required to cool the air compressors.

The Direct Carbon Dioxide Capture Process and the Indirect Carbon Dioxide Capture Process focus on addressing both the quantity issues of removing carbon dioxide from the air and the urgency issues in removing the carbon dioxide from the air:
In addressing the quantity issues, the two processes provide means for completely removing small concentrations of carbon dioxide from large amounts of air (or water in equilibrium with air) using air compressors (or pumps).
In addressing the urgency issues, the two processes can be expeditiously engineered and constructed using technology that is commonly used by and/or readily available to industry today.

BRIEF DESCRIPTION OF SEVERAL VIEWS OF THE DRAWINGS

FIG. 4A is a Process Flow Diagram illustrating the Direct Carbon Dioxide Capture process that simultaneously separates and enriches carbon dioxide directly from air for sequestration using water. Reference letters and numbers are tabulated in FIG. 4B, FIG. 4C, and FIG. 4D as described below.

FIG. 4B is a Process Equipment List that lists the major process equipment shown in FIG. 4A, with reference numbers from 1A through 1H.

FIG. 4C is a Process Equipment List that lists the minor process equipment shown in FIG. 4A, with reference numbers from 1J through 1R.

FIG. 4D is a Process Line List that lists the process streams shown in FIG. 4A (in italics), with reference numbers from 101 through 118.

FIG. 4E is a graph that shows gas and water stream flowrates of the "Direct Process" in FIG. 4A operating at 147 psia pressure and compares these flowrates to that required if operating at 14.7 psia pressure.

FIG. 4F is a graph that plots gas and water flowrates from the aerators in FIG. 4A as a function of aerator pressure.

FIG. 4G is a graph that plots greenhouse gas equivalencies of carbon dioxide removed from air for 100 years using ninety 30,000 scfm air compressors powered by an Ivanpah Equivalent Solar Power Facility.

FIG. 5A is a Process Flow Diagram illustrating the Indirect Carbon Dioxide Capture process that simultaneously separates and enriches carbon dioxide indirectly from air for sequestration using water in equilibrium with air at 0° C. Reference letters and numbers are tabulated in FIG. 5B, FIG. 5C, and FIG. 5D as described below.

FIG. 5B is a Process Equipment List that lists the major process equipment shown in FIG. 5A, with reference numbers from 2A through 2H.

FIG. 5C is a Process Equipment List that lists the minor process equipment shown in FIG. 5A, with reference numbers from 2J through 2T.

FIG. 5D is a Process Line List that lists the process streams shown in FIG. 5A (in italics), with reference numbers from 201 through 218.

FIG. 5E is a graph that shows gas and water stream flowrates of the "Indirect Process" in FIG. 5A operating at 147 psia pressure and compares these flowrates to that required if operating at 14.7 psia pressure.

DETAILED DESCRIPTION OF THE INVENTION

I. Introduction

Figure 1:
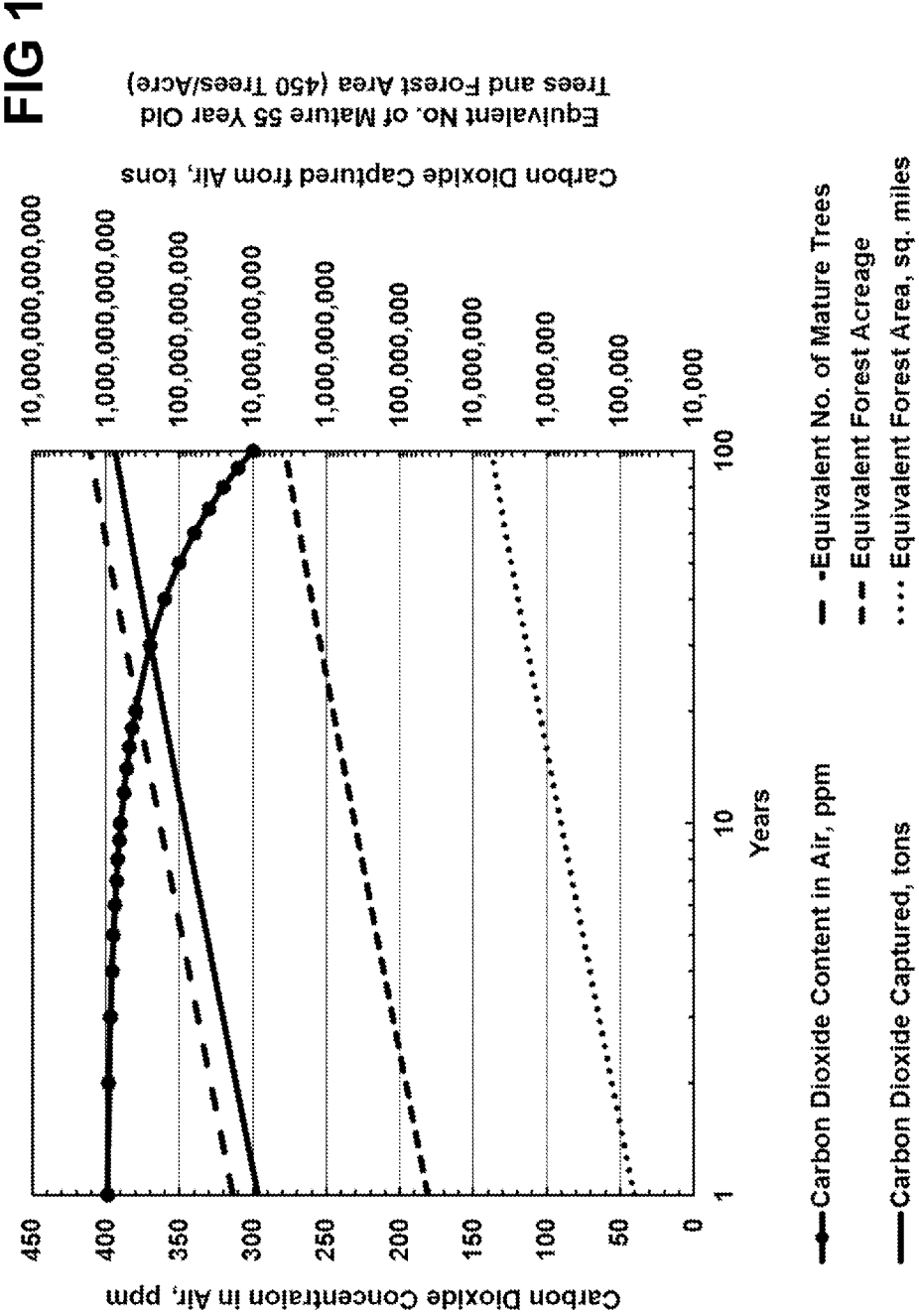
FIG. 1 is a graph that plots the quantity of $CO_2$ capture from the atmosphere that is required to reduce the global atmospheric CO₂ concentration from 400 to 300 ppm over 100 years using 23.8 million 30,000 scfm air compressors.

A process is proposed that separates and enriches carbon dioxide for sequestration from water that is in equilibrium with the atmosphere. The process was conceptualized when it was realized that removing carbon dioxide for sequestration from water that is in equilibrium with atmospheric air serves the same purpose (i.e., in reducing global warming) as actually removing carbon dioxide for sequestration from atmospheric air itself. If water in equilibrium with air has already captured carbon dioxide from the air, why not remove carbon dioxide from the water rather than the air. The water could then be returned back to the natural environment from whence it came to capture more carbon dioxide from air.

But, how can carbon dioxide best be captured from the water in a quality suitable for sequestration? From Henry's Law on the solubility of atmospheric gases in water, discussed below, I realized that the Henry's Law constant for carbon dioxide is very much higher than that for all the other atmospheric gases, meaning that carbon dioxide gas is much more soluble in water than any of the other atmospheric gases. The mole percent of carbon dioxide gas in water in equilibrium with atmospheric air (~2.37%) is almost 60 times the mole percent of carbon dioxide gas in atmospheric air (~0.04%), while that of each of the other atmospheric gases is less than they are in atmospheric air.

What would happen if the "air" is removed (or stripped) from this water and dissolved in clean, deaerated water? Again, applying Henry's Law, the resultant mole percent of carbon dioxide gas in the clean, aerated water would be 56.06%, almost 24 times the mole percent of carbon dioxide gas in natural water (~2.37%). Note that the purity of the carbon dioxide gas in each of the smaller streams has now increased from a mole percent of ~0.04% in the air, to a mole percent of ~2.37% in natural water, and finally, to a mole percent of 56.06% in the clean, aerated water. If the atmospheric gases were further stripped from the water and dissolved in clean, deaerated water two more times, the purity of the carbon dioxide gas in the two small output streams would increase further to 98.32% and 99.96%, respectively, which could then be suitable for sequestration. This "convenient truth" provides a "window of opportunity" for capturing carbon dioxide for sequestration both from air using water and from natural water using water.

II. Dissolved Atmospheric Gases in Water as Determined by Henry's Law

The following is from an article in the website of *Wikipedia, the free encyclopedia*, entitled, "*Henry's law*" (http://en.wikipedia.org/wiki/Henry's_law).

The equilibrium relationship between the concentration of a gas in air and that dissolved in water in equilibrium with the air is determined by Henry's law, formulated by William Henry in 1803, that states:

At a constant temperature, the amount of a given gas that dissolves in a given type and volume of liquid is directly proportional to the partial pressure of that gas in equilibrium with that liquid.

An equivalent way of stating Henry's law is that the solubility of a gas in a liquid is directly proportional to the partial pressure of the gas above the liquid. Henry's law can be put into mathematical terms (at constant temperature) as follows:

$$P = K_H C$$

where:
P=the partial pressure of the gaseous solute above the solution
C=the concentration of the dissolved gas
$K_H$=Henry's law constant with the dimensions of pressure divided by concentration There are various other forms of Henry's Law that define the constant (or coefficient), $K_H$, differently and require different dimensional units. In particular, the "concentration" of the solute in solution may also be expressed as a mole fraction or as a molarity. Other forms of Henry's law, specifically for atmospheric gases dissolved in water in equilibrium with air, are tabulated in Table 1.

water using water is feasible; the latter "truth" confirms that the former "truth" can best be accomplished at low water temperatures.

Gas in the atmosphere is dissolved in water in proportion to the partial pressure of that gas in equilibrium with the water;

TABLE 1

Other Forms of Henry's Gas Coefficients, $K_H$ (Gases in Water at 25° C.)

| Gas in Air | Mole Fraction in Air (Note) | $K_H=P/C_{aq}$ (L-atm/mol) | $K_H=C_{aq}/P$ (mol/L-atm) | $K_H=P/x$ (atm) | $K_H=C_{aq}/C_{gas}$ (unitless) |
|---|---|---|---|---|---|
| $N_2$ | 0.78084 | 1639.34 | $6.1 \times 10^{-4}$ | $9.077 \times 10^4$ | $1.492 \times 10^{-2}$ |
| $O_2$ | 0.209476 | 769.23 | $1.3 \times 10^{-3}$ | $4.259 \times 10^4$ | $3.181 \times 10^{-2}$ |
| Ar | 0.00934 | 714.28 | $1.4 \times 10^{-3}$ | $3.955 \times 10^4$ | $3.425 \times 10^{-2}$ |
| $CO_2$ | 0.000314 | 29.41 | $3.4 \times 10^{-2}$ | $0.163 \times 10^4$ | 0.8317 |
| Ne | 0.00001818 | 2222.22 | $4.5 \times 10^{-4}$ | $12.30 \times 10^4$ | $1.101 \times 10^{-2}$ |
| $CH_4$ | 0.000002 | — | — | — | — |
| He | 0.00000524 | 2702.7 | $3.7 \times 10^{-4}$ | $14.97 \times 10^4$ | $9.051 \times 10^{-3}$ |
| Kr | 0.00000114 | — | — | — | — |
| $H_2$ | 0.0000005 | 1282.05 | $7.8 \times 10^{-4}$ | $7.099 \times 10^4$ | $1.907 \times 10^{-2}$ |
| Xe | 0.000000087 | — | — | — | — |
| CO | — | 1052.63 | $9.5 \times 10^{-4}$ | $5.828 \times 10^4$ | $2.324 \times 10^{-2}$ | where:
$K_H$ = Henry's gas constant (or coefficient)
$C_{aq}$ = concentration (or molarity) of gas in solution (in mol/L)
$C_{gas}$ = concentration of gas above the solution (in mol/L)
P = partial pressure of gas above the solution (in atm)
x = mole fraction of gas in solution (dimensionless)
Note:
"Gas composition," Wikipedia, the free encyclopedia, http://en.wikipedia.org/wiki/Gas_composition.

Figure 2:
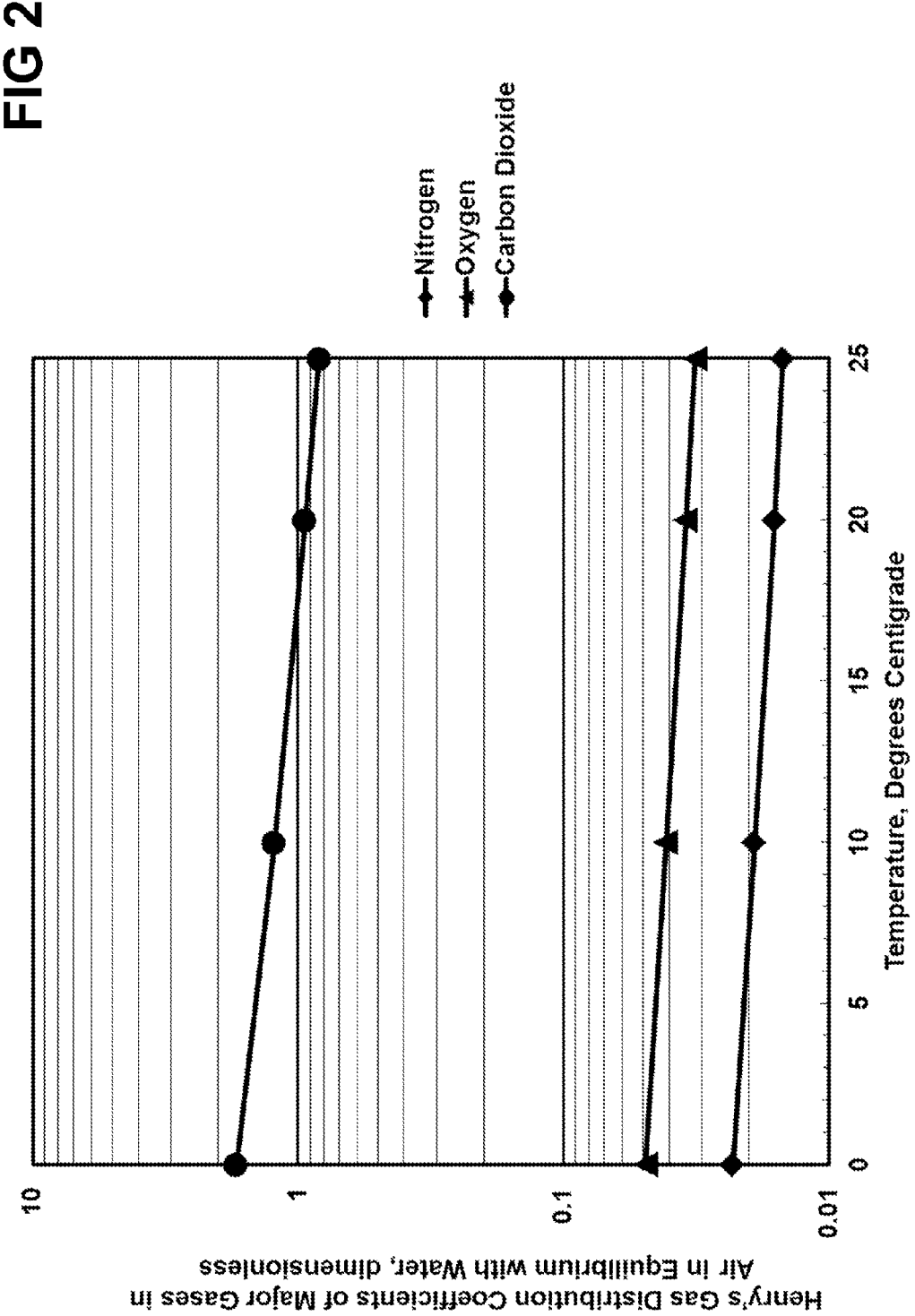
FIG. 2 is a graph that plots Henry's gas distribution coefficients, $K_H$, as a function of temperature of major gases in air in equilibrium with water.

Henry's gas distribution coefficients, $K_H$, of the major gases in air in equilibrium with water at various temperatures are tabulated in Table 2. The Henry's gas distribution coefficients, $K_H$, of nitrogen, oxygen, and carbon dioxide, as tabulated in Table 2, are plotted as a function of temperature in FIG. 2.

however, the amount of the gas dissolved in the water is also a function of the solubility of that gas in the water. If the solubility of atmospheric gases in water were the same, the proportion of the atmospheric gases in the air and the proportion of the atmospheric gases in the water would also be the same, but they are not. The proportion of the atmospheric

TABLE 2

Henry's Gas Distribution Coefficients, $K_H$, of Major Gases in Air in Equilibrium with Water
Henry's Gas Distribution Coefficient ($K_H = C_{aq}/C_{ga}$)

| Major Gases in Air | (Note 1) | | | | Molecular Weight |
|---|---|---|---|---|---|
| | T = 0° C. (Note 2) | T = 10° C. (Note 2) | T = 20° C. (Note 2) | T = 25° C. (Note 3) | (MW) [g/mol] |
| Nitrogen | 0.023 | 0.019 | 0.016 | 0.01492 | 28 |
| Oxygen | 0.049 | 0.041 | 0.033 | 0.03181 | 32 |
| Carbon Dioxide | 1.71 | 1.23 | 0.942 | 0.8317 | 44 |

Note 1:
Dimensionless ratio of the concentration of the gas in water (moles, g/m³, mg/L, etc.) and the concentration of the same gas in air (moles, g/m³, mg/L, etc.)
Note 2:
"Henry's law," Wikipedia, the free encyclopedia, http://en.wikipedia.org/wiki/Henry's_law.
Note 3:
"Water Treatment, Aeration, and Gas Stripping," Delft University of Technology (TU Delft), Delft, Netherlands, http://ocw.tudelft.nl/fileadmin/ocw/courses/DrinkingWaterTreatment1/res00071/embedded/!4165726174696f6e20616e6420476173205374 72697 0 0696e6732303037.pdf.

As evidenced by the higher Henry's gas distribution coefficients at all temperatures for carbon dioxide as compared to those for nitrogen and oxygen in Tables 1 and 2:

The concentration of carbon dioxide in water versus that in air is higher than the concentration of oxygen and nitrogen in water versus that in air.

The concentration of carbon dioxide is higher in water than it is in air at lower temperatures but is less in water than it is in air at higher temperatures.

The former "truth" confirms that capturing carbon dioxide for sequestration both from air using water and from natural gases dissolved in water in equilibrium with air is not in the same proportion as they are in the air. Technically, therefore, the dissolved "air" in water is not really "air" as we know it, but is actually dissolved atmospheric gases in different proportions than that found in air, albeit, with carbon dioxide being the only atmospheric gas having a higher proportion in water than in air.

In Table 2, the Henry's Gas Distribution Coefficient, $K_H$, for carbon dioxide at 0° C. is shown to be 1.71 (moles, g/m³, or mg/L, etc. in water per moles, g/m³, or mg/L, etc. in air), which means that the concentration of carbon dioxide in water (at 0° C.) is 1.71 times that in air (at standard conditions). Therefore, the volume of air (at standard conditions) containing one ton of carbon dioxide is approximately 1.71 times the volume of water at 0° C. also containing one ton of carbon dioxide. Conversely, the volume of water at 0° C. containing one ton of carbon dioxide is approximate 58.5% (i.e., the inverse of 1.71×100) of the volume of air (at standard conditions) containing one ton of carbon dioxide.

As the volume of water containing one ton of carbon dioxide is less than the volume of air containing one ton of carbon dioxide, a logical alternative to capturing carbon dioxide directly from air would be to capture the dissolved carbon dioxide in the water that is in equilibrium with the air. With a carbon dioxide concentration in air of 400 ppm by volume, approximately 40.9 million standard cubic feet (MMSCF) of air would need to be processed to remove one ton of carbon dioxide from air (assuming 100% carbon dioxide removal). Alternatively, approximately 179 million gallons of water (at 0° C. and 1 atm) would need to be processed to affectively remove an equivalent one ton of carbon dioxide from the air in equilibrium with it (also assuming 100% carbon dioxide removal).

III. Capturing Carbon Dioxide from Water for Sequestration

Theoretically, carbon dioxide capture for sequestration can be accomplished through multiple stages of aeration (dissolving of the gas into water) followed by deaeration (stripping of the gas from the water) until only a high concentration of carbon dioxide remains that is of sufficient quality for sequestration. Table 3 tabulates the gaseous concentrations of the three major atmospheric gases in equilibrium with water at 0° C. during the enrichment process of atmospheric carbon dioxide gas to an almost 100% pure carbon dioxide gas stream. The gaseous concentrations shown in Table 3 theoretically assume that all the dissolved gases are removed from the water in the deaerator and that these gases are allowed to completely equilibrate with fresh water at 14.7 psia in the aerator.

TABLE 3

Carbon Dioxide Capture from Water at 0° C. Using Multiple Gas Deaeration (Removal) and Gas Aeration (Addition) Stages

| Gas | $N_2$ | $O_2$ | $CO_2$ |
|---|---|---|---|
| Gas Molecular Weight | 28.0134 | 31.9988 | 44.01 |
| *Gas Concentration in Air* | | | |
| Percent of Gas Volume or Pressure | 78.03 | 20.99 | 0.04 |
| Concentration in Air @ 0° C., $g/m^3$ (mg/l) | 971.69 | 298.57 | 0.78 |
| $K_H$, $g/m^3$ wtr/$g/m^3$ Gas, @ 0° C. | 0.023 | 0.049 | 1.71 |
| *Gas Concentration in Water* | | | |
| Saturation Concentration @ 0° C., $g/m^3$ (mg/l) | 22.35 | 14.63 | 1.34 |
| Saturation Concentration @ 0° C., moles/$m^3$ | 0.7978 | 0.4572 | 0.0304 |
| Percent of Total Gas Volume dissolved in Water | 62.07 | 35.57 | 2.37 |
| *Gas Concentration in Gas from Initial Water Deaerator* | | | |
| Percent of Gas Volume or Pressure | 62.07 | 35.57 | 2.37 |
| Concentration in Deaerator Gas @ 0° C., $g/m^3$ (mg/l) | 772.91 | 505.95 | 46.28 |
| KH, $g/m^3$ wtr/$g/m^3$ Gas, @ 0° C. | 0.023 | 0.049 | 1.71 |
| *Gas Concentration in Water from First Stage Gas Aerator* | | | |
| Saturation Concentration @ 0° C., $g/m^3$ (mg/l) | 17.78 | 24.79 | 79.14 |
| Saturation Concentration @ 0° C., moles/$m^3$ | 0.6346 | 0.7748 | 1.7982 |
| Percent of Total Gas Volume dissolved in Water | 19.78 | 24.15 | 56.06 |
| *Gas Concentration in Gas from First Stage Gas Deaerator* | | | |
| Percent of Gas Volume or Pressure | 19.78 | 24.15 | 56.06 |
| Concentration in Deaerator Gas @ 0° C., $g/m^3$ (mg/l) | 246.37 | 343.59 | 1,097 |
| KH, $g/m^3$ wtr/$g/m^3$ Gas, @ 0° C. | 0.023 | 0.049 | 1.71 |
| *Gas Concentration in Water from Second Stage Gas Aerator* | | | |
| Saturation Concentration @ 0° C., $g/m^3$ (mg/l) | 5.67 | 16.84 | 1,875 |
| Saturation Concentration @ 0° C., moles/$m^3$ | 0.2023 | 0.5261 | 42.6152 |
| Percent of Total Gas Volume dissolved in Water | 0.47 | 1.21 | 98.32 |
| *Gas Concentration in Gas from Second Stage Gas Deaerator* | | | |
| Percent of Gas Volume or Pressure | 0.47 | 1.21 | 98.32 |
| Concentration in Deaerator Gas @ 0° C., $g/m^3$ (mg/l) | 5.81 | 17.27 | 1,924 |
| KH, $g/m^3$ wtr/$g/m^3$ Gas, @ 0° C. | 0.023 | 0.049 | 1.71 |
| *Gas Concentration in Water from Third Stage Gas Aerator* | | | |
| Saturation Concentration @ 0° C., $g/m^3$ (mg/l) | 0.13 | 0.85 | 3,289 |
| Saturation Concentration @ 0° C., moles/$m^3$ | 0.0048 | 0.0264 | 74.7383 |
| Percent of Total Gas Volume dissolved in Water | 0.01 | 0.04 | 99.96 |
| *Gas Concentration in Gas from Third Stage Gas Deaerator* | | | |
| Percent of Gas Volume or Pressure | 0.01 | 0.04 | 99.96 |
| Concentration in Deaerator Gas @ 0° C., $g/m^3$ (mg/l) | 0.08 | 0.50 | 1,956 |

Figure 3:
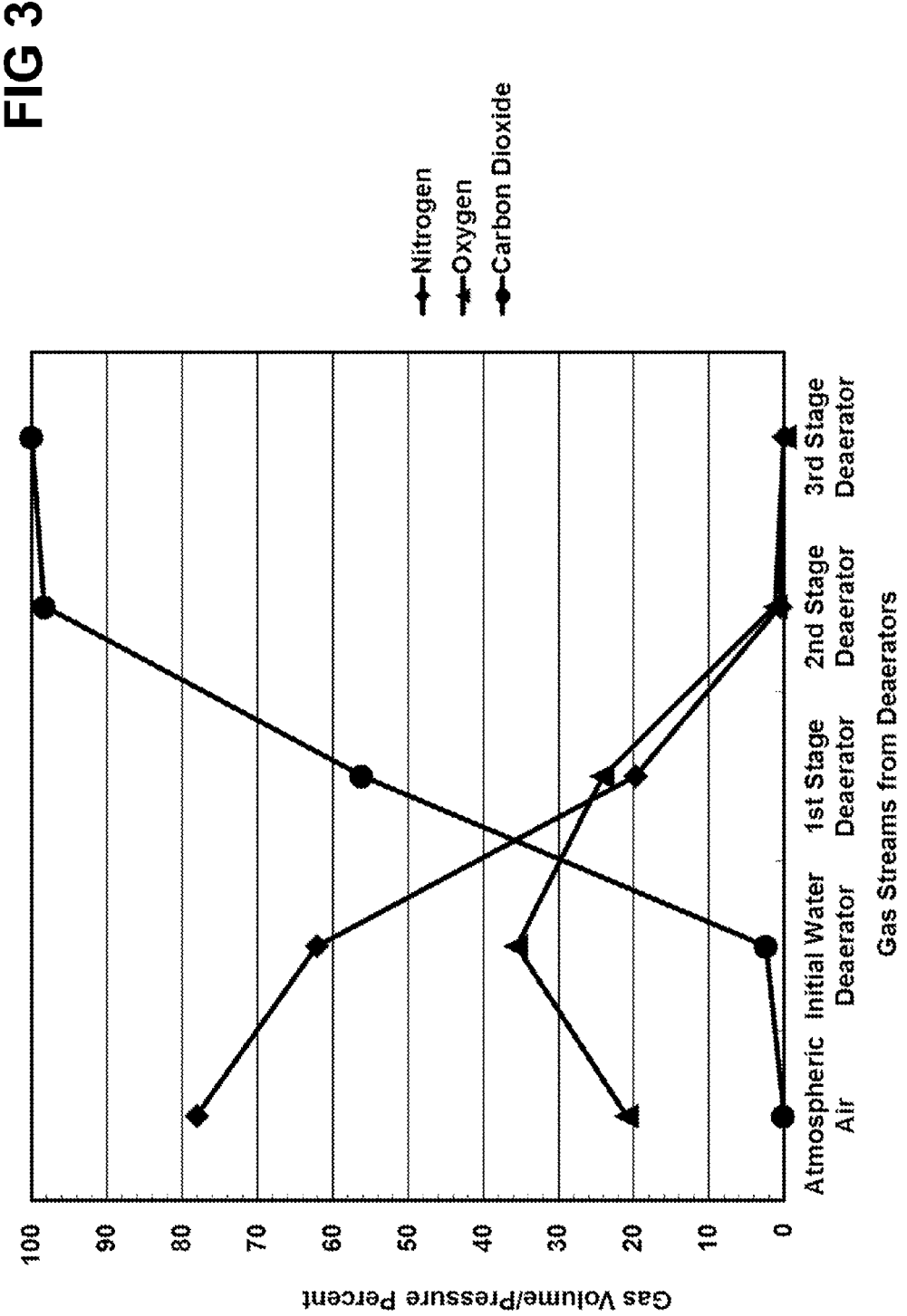
FIG. 3 is a graph that plots the gas volume/pressure percent concentrations (as calculated using Henry's gas distribution coefficients, $K_H$, in Table 3) of the three major atmospheric gases in the deaerator gas streams (nitrogen, oxygen, and carbon dioxide) within a multiple-staged aeration/deaeration system.

FIG. 3 is a graph that plots the gas volume/pressure percent concentrations (as calculated using Henry's gas distribution coefficients, $K_H$, in Table 3) of the three major atmospheric gases in the deaerator gas streams (nitrogen, oxygen, and carbon dioxide) within a multiple-staged aeration/deaeration system. In this graph, nitrogen gas concentrations in water decrease with each successive aeration stage, but oxygen gas concentrations in water first increase, then decrease with each successive aeration stage. This is due to the solubility of both nitrogen and oxygen in water being less than that of carbon dioxide while that of nitrogen also being less than that of oxygen.

IV. Proposed Direct and Indirect Carbon Dioxide Capture Processes

Two processes are proposed for removing carbon dioxide from air and enriching the carbon dioxide to a quality sufficient for sequestration using water:
1. Direct carbon dioxide capture from air using water
2. Indirect carbon dioxide capture from air using water in equilibrium with air Both $CO_2$ Capture Processes employ another process, the Carbon Dioxide Separation and Enrichment Process, again using water, to simultaneously separate carbon dioxide from air and enrich it to a high enough purity for sequestration.

The difference between the two proposed processes is the manner in which carbon dioxide is originally transferred from the air to the water as described below:
1. In the Direct Carbon Dioxide Capture Process, water is aerated with compressed air in an aerator where the carbon dioxide and other atmospheric gases in the air are easily dissolved in the water at the higher pressure. The water is subsequently deaerated at atmospheric pressure in a deaerator to remove these dissolved gases, which are then compressed for processing in the Carbon Dioxide Separation and Enrichment Process.
2. In the Indirect Carbon Dioxide Capture Process, the "aerated" water is natural water in equilibrium with the air that already contains carbon dioxide and other atmospheric gases dissolved from the air. The natural water need only be deaerated under vacuum to remove these dissolved gases, which are then compressed for processing in the Carbon Dioxide Separation and Enrichment Process.

The natural water used in the Indirect Carbon Dioxide Capture Process can be any natural water that contains free carbon dioxide in equilibrium with the atmosphere. The following, however, should be considered when selecting suitable water for carbon dioxide capture:
1. The natural water should be optimum for dissolving atmospheric carbon dioxide in its free state without it binding with other ions in the water.
2. Because the solubility of gases increases with decreasing water temperature and decreases with increasing water salinity, the water should be as cold and as fresh as possible.
3. As the goal is to remove carbon dioxide from the atmosphere, the water should equilibrate with the atmosphere soon after deaerating it.

The Carbon Dioxide Separation and Enrichment Process involves multiple aeration/deaeration stages in series that take atmospheric gases from either the Direct Carbon Dioxide Capture Process or the Indirect Carbon Dioxide Capture Process and process them to separate and enrich the carbon dioxide from the other atmospheric gases. The atmospheric gases flow consecutively through each of the Carbon Dioxide Separation and Enrichment Stages where the atmospheric gases are initially dissolved in water in each of the stage's Aerators and then are subsequently stripped from the water in each of the stage's Deaerators.

V. Description of the Direct and Indirect Carbon Dioxide Capture Process Flow Diagrams The Process Flow Diagram for the Direct Carbon Dioxide Capture Process is shown in FIG. 4A and the Process Flow Diagram for the Indirect Carbon Dioxide Capture Process is shown in FIG. 5A. Each Process Flow Diagram is sectionalized (shown with heavy dashed line partitions) between two sub-processes labelled as follows:
1. Air Capture
2. $CO_2$ Enrichment The "$CO_2$ Enrichment" Process label is a shortened version of the "$CO_2$ Separation and Enrichment" Process.

The Air Capture Processes shown on the two Process Flow Diagrams are different:
The Air Capture Process for the Direct Carbon Dioxide Capture Process, shown on the Process Flow Diagram in FIG. 4A, extracts (captures) carbon dioxide (with other atmospheric gases) directly from air.
The Air Capture Process for the Indirect Carbon Dioxide Capture Process, shown on the Process Flow Diagram in FIG. 5A, extracts (captures) carbon dioxide (with other atmospheric gases) indirectly from air using water in equilibrium with air.

The $CO_2$ Enrichment Processes (or more specifically, the $CO_2$ Separation and Enrichment Processes) shown on the two Process Flow Diagrams, however, are the same.

Gas and water process stream flowrates shown on the Process Flow Diagrams in FIG. 4A and FIG. 5A are for the operating case where the aerators are operated at sea level at 147 psia (132.3 psig), which is exactly ten times the atmospheric pressure at sea level of 14.7 psia (0 psig). Also, the water process stream flowrates shown on the Process Flow Diagrams in FIG. 4A and FIG. 5A are calculated considering that the amount of carbon dioxide leaving the aerators at 147 psia minus that retained in the deaerators at 14.7 psia is equivalent to 1 ton/day.

For the Direct Carbon Dioxide Capture process shown in FIG. 4A:
1. FIG. 4B lists the major process equipment shown in FIG. 4A, with reference numbers from 1A through 1H.
2. FIG. 4C lists the minor process equipment shown in FIG. 4A, with reference numbers from 1J through 1R.
3. FIG. 4D lists the process streams shown in FIG. 4A (in italics), with reference numbers from 101 through 118.
4. Pressure letdown valves shown in FIG. 4A have reference numbers from V11 through V14.

For the Indirect Carbon Dioxide Capture process shown in FIG. 5A:
1. FIG. 5B lists the major process equipment shown in FIG. 5A, with reference numbers from 2A through 2H.
2. FIG. 5C lists the minor process equipment shown in FIG. 5A, with reference numbers from 2J through 2T.
3. FIG. 5D lists the process streams shown in FIG. 5A (in italics), with reference numbers from 201 through 218.
4. Pressure letdown valves shown in FIG. 5A have reference numbers from V22 through V44.

VI. Detailed Description of the Direct Carbon Dioxide Capture Process in FIG. 4A A. Detailed Description of the Air Capture Process in FIG. 4A
The following is a detailed description of the Air Capture Process shown in FIG. 4A. References to major process equipment, minor process equipment, process streams, and pressure letdown valves shown in FIG. 4A are provided within brackets.

In FIG. 4A, atmospheric air is compressed by the Air Capture Stage Inlet Air Compressor [1J] from atmospheric pressure (e.g., 14.7 psia) [101] to an economically suitable pressure for aeration of water (e.g., 147 psia) [102] within the Air Capture Stage Aerator [1A]. In the water aeration process, carbon dioxide and some of the other atmospheric gases in the air are dissolved into the water. The air and water should be as cold as possible (not freezing) to maximize the quantity of atmospheric gases dissolved in the water. Atmospheric gases not dissolved in the water are released to the atmosphere.

Water used in the aeration process in the Air Capture Stage Aerator [1A] is deaerated water containing a minimal concentration of dissolved gases. This water, which is recycled between the Air Capture Stage Aerator [1A] and the Air Capture Stage Deaerator [1B], is deaerated at 14.7 psia [103] in the Air Capture Stage Deaerator [1B]. The Air Capture Stage Water Recycle Pump [1K] pumps the water in a continuous recycle loop from 14.7 psia [103], the operating pressure of the Air Capture Stage Deaerator [1B], to 147 psia [104], the operating pressure of the Air Capture Stage Aerator [1A]. Aerated water from the Air Capture Stage Aerator [1A] flows back to the Air Capture Stage Deaerator [1B] across a pressure letdown valve [V11] where the water pressure is reduced from 147 psia [104] back to 14.7 psia [103].

Atmospheric gases from the Air Capture Stage Deaerator [1B], operating at a pressure of 14.7 psia [105], are compressed by the Air Capture Stage Gas Outlet Compressor [1L] to 147 psia [106], the operating pressure of the $CO_2$ Enrichment Stage 1 Aerator [1C] located in the first of three $CO_2$ Enrichment Stages within the $CO_2$ Separation and Enrichment Process.

B. Detailed Description of the $CO_2$ Separation and Enrichment Process in FIG. 4A The following is a detailed description of the $CO_2$ Separation and Enrichment Process shown in FIG. 4A. References to major process equipment, minor process equipment, process streams, and pressure letdown valves shown in FIG. 4A are provided within brackets.

FIG. 4A $CO_2$ Enrichment Stage 1

In FIG. 4A, the $CO_2$ Enrichment Stage 1 Aerator [1C], located in the first of three $CO_2$ Enrichment Stages within the $CO_2$ Separation and Enrichment Process, receives compressed atmospheric gases from the Air Capture Stage Gas Outlet Compressor [1L] at a pressure of 147 psia [106] for aeration of water within the aerator. In the water aeration process, carbon dioxide and some of the other atmospheric gases are dissolved into the water. Atmospheric gases not dissolved in the water are released to the atmosphere.

Water used in the aeration process in the $CO_2$ Enrichment Stage 1 Aerator [1C] is deaerated water containing a minimal concentration of dissolved gases. This water, which is recycled between the $CO_2$ Enrichment Stage 1 Aerator [1C] and the $CO_2$ Enrichment Stage 1 Deaerator [1D], is deaerated at 14.7 psia [107] in the $CO_2$ Enrichment Stage 1 Deaerator [1D]. The $CO_2$ Enrichment Stage 1 Water Recycle Pump [1M] pumps the water in a continuous recycle loop from 14.7 psia [107], the operating pressure of the $CO_2$ Enrichment Stage 1 Deaerator [1D], to 147 psia [108], the operating pressure of the $CO_2$ Enrichment Stage 1 Aerator [1C]. Aerated water from the $CO_2$ Enrichment Stage 1 Aerator [1C] flows back to the $CO_2$ Enrichment Stage 1 Deaerator [1D] across a pressure letdown valve [V12], where the water pressure is reduced from 147 psia [108] back to 14.7 psia [107].

Atmospheric gases from the $CO_2$ Enrichment Stage 1 Deaerator [1D] are compressed from a pressure of 14.7 psia [109] by the $CO_2$ Enrichment Stage 1 Gas Outlet Compressor [1N] to a pressure of 147 psia [110], the operating pressure of the $CO_2$ Enrichment Stage 2 Aerator [1E] located in the second of three $CO_2$ Enrichment Stages within the $CO_2$ Separation and Enrichment Process.

FIG. 4A $CO_2$ Enrichment Stage 2

In FIG. 4A, the $CO_2$ Enrichment Stage 2 Aerator [1E], located in the second of three $CO_2$ Enrichment Stages within the $CO_2$ Separation and Enrichment Process, receives compressed atmospheric gases from the $CO_2$ Enrichment Stage 1 Gas Outlet Compressor [1N] at a pressure of 147 psia [110] for aeration of water within the aerator. In the water aeration process, carbon dioxide and some of the other atmospheric gases are dissolved into the water. Atmospheric gases not dissolved in the water are released to the atmosphere.

Water used in the aeration process in the $CO_2$ Enrichment Stage 2 Aerator [1E] is deaerated water containing a minimal concentration of dissolved gases. This water, which is recycled between the $CO_2$ Enrichment Stage 2 Aerator [1E] and the $CO_2$ Enrichment Stage 2 Deaerator [1F], is deaerated at 14.7 psia [111] in the $CO_2$ Enrichment Stage 2 Deaerator [1F]. The $CO_2$ Enrichment Stage 2 Water Recycle Pump [1O] pumps the water in a continuous recycle loop from 14.7 psia [111], the operating pressure of the $CO_2$ Enrichment Stage 2 Deaerator [1F], to 147 psia [112], the operating pressure of the $CO_2$ Enrichment Stage 2 Aerator [1E]. Aerated water from the $CO_2$ Enrichment Stage 2 Aerator [1E] flows back to the $CO_2$ Enrichment Stage 2 Deaerator [1F] across a pressure letdown valve [V13], where the water pressure is reduced from 147 psia [112] back to 14.7 psia [111].

Atmospheric gases from the $CO_2$ Enrichment Stage 2 Deaerator [1F] are compressed from a pressure of 14.7 psia [113] by the $CO_2$ Enrichment Stage 2 Gas Outlet Compressor [1P] to a pressure of 147 psia [114], the operating pressure of the $CO_2$ Enrichment Stage 3 Aerator [1G] located in the third of three $CO_2$ Enrichment Stages within the $CO_2$ Separation and Enrichment Process.

FIG. 4A $CO_2$ Enrichment Stage 3

In FIG. 4A, the $CO_2$ Enrichment Stage 3 Aerator [1G], located in the third of three $CO_2$ Enrichment Stages within the $CO_2$ Separation and Enrichment Process, receives compressed atmospheric gases from the $CO_2$ Enrichment Stage 2 Gas Outlet Compressor [1P] at a pressure of 147 psia [114] for aeration of water. In the water aeration process, carbon dioxide and some of the other atmospheric gases are dissolved into the water. Atmospheric gases not dissolved in the water are released to the atmosphere.

Water used in the aeration process in the $CO_2$ Enrichment Stage 3 Aerator [1G] is deaerated water containing a minimal concentration of dissolved gases. This water, which is recycled between the $CO_2$ Enrichment Stage 3 Aerator [1G] and the $CO_2$ Enrichment Stage 3 Deaerator [1H], is deaerated at 14.7 psia [115] in the $CO_2$ Enrichment Stage 3 Deaerator [1H]. The $CO_2$ Enrichment Stage 3 Water Recycle Pump [1Q] pumps the water in a continuous recycle loop from 14.7 psia [115], the operating pressure of the $CO_2$ Enrichment Stage 3 Deaerator [1H], to 147 psia [116], the operating pressure of the $CO_2$ Enrichment Stage 3 Aerator [1G]. Aerated water from the $CO_2$ Enrichment Stage 3 Aerator [1G] flows back to the $CO_2$ Enrichment Stage 3 Deaerator [1H] across a pressure letdown valve [V14], where the water pressure is reduced from 147 psia [116] back to 14.7 psia [115].

Atmospheric gases rich in carbon dioxide from the $CO_2$ Enrichment Stage 3 Deaerator [1H] are compressed from a pressure of 14.7 psia [117] by the $CO_2$ Enrichment Stage 3

Gas Outlet Compressor [1R] to a pressure of 147 psia [118] (or another pressure suitable for $CO_2$ sequestration).

VII. Detailed Description of the Indirect Carbon Dioxide Capture Process in FIG. 5A A. Detailed Description of the Air Capture Process in FIG. 5A The following is a detailed description of the C Air Capture Process shown in FIG. 5A. References to major process equipment, minor process equipment, process streams, and pressure letdown valves shown in FIG. 5A are provided within brackets.

In FIG. 5A, natural water in equilibrium with atmospheric air is pumped from a Natural Water Source, e.g., Lake or River [2A], at atmospheric pressure (e.g., 14.7 psia) [201] by the Natural Water Inlet Pump [2J] to the Natural Water Deaerator [2B], which operates at a vacuum or near vacuum (e.g., 0 psia) [202]. Although all natural waters contain dissolved atmospheric gases, the natural water utilized in the $CO_2$ Extraction Process should be as cold as possible (not freezing) to maximize the quantity of atmospheric gases dissolved in the water. The vacuum in the Natural Water Deaerator [2B], created by the Air Capture Stage Vacuum Pump [2S], causes the release of the atmospheric gases naturally dissolved in the water from the air at atmospheric pressure. After deaeration in the Natural Water Deaerator [2B], the natural water [203] is (or should be) returned back to (but downstream of or away from} its source by the Natural Water Outlet Pump [2K] via a water outfall or aeration basin where the water is reaerated to replenish its oxygen content.

Atmospheric gases from the Natural Water Deaerator [2B], operating at full (or nearly so) vacuum [204], are compressed/pumped by the Air Capture Stage Vacuum Pump [2S] to the Air Capture Stage Gas Accumulator Drum [2T], operating at a pressure of 14.7 psia [205]. The atmospheric gases from the Air Capture Stage Gas Accumulator Drum [2T] are compressed by the Air Capture Stage Gas Outlet Compressor [2L] from 14.7 psia [205] to 147 psia [206], the operating pressure of the $CO_2$ Enrichment Stage 1 Aerator [2C] located in the first of three $CO_2$ Enrichment Stages within the $CO_2$ Separation and Enrichment Process.

B. Detailed Description of the $CO_2$ Separation and Enrichment Process in FIG. 5A The following is a detailed description of the $CO_2$ Separation and Enrichment Process shown in FIG. 5A. References to major process equipment, minor process equipment, process streams, and pressure letdown valves shown in FIG. 5A are provided within brackets.

FIG. 5A $CO_2$ Enrichment Stage 1

In FIG. 5A, the $CO_2$ Enrichment Stage 1 Aerator [2C], located in the first of three $CO_2$ Enrichment Stages within the $CO_2$ Separation and Enrichment Process, receives compressed atmospheric gases from the Air Capture Stage Gas Outlet Compressor [2L] at a pressure of 147 psia [206] for aeration of water. In the water aeration process, carbon dioxide and some of the other atmospheric gases are dissolved into the water. Atmospheric gases not dissolved in the water are released to the atmosphere or are used for reaeration of the deaerated natural water before it is discharged back into the environment.

Water used in the aeration process in the $CO_2$ Enrichment Stage 1 Aerator [2C] is deaerated water containing a minimal concentration of dissolved gases. This water, which is recycled between the $CO_2$ Enrichment Stage 1 Aerator [2C] and the $CO_2$ Enrichment Stage 1 Deaerator [2D], is deaerated at 14.7 psia [207] in the $CO_2$ Enrichment Stage 1 Deaerator [2D]. The $CO_2$ Enrichment Stage 1 Water Recycle Pump [2M] pumps the water in a continuous recycle loop from 14.7 psia [207], the operating pressure of the $CO_2$ Enrichment Stage 1 Deaerator [2D], to 147 psia [208], the operating pressure of the $CO_2$ Enrichment Stage 1 Aerator [2C]. Aerated water from the $CO_2$ Enrichment Stage 1 Aerator [2C] flows back to the $CO_2$ Enrichment Stage 1 Deaerator [2D] across a pressure letdown valve [V22], where the water pressure is reduced from 147 psia [208] back to 14.7 psia [207].

Atmospheric gases from the $CO_2$ Enrichment Stage 1 Deaerator [2D] are compressed from a pressure of 14.7 psia [209] by the $CO_2$ Enrichment Stage 1 Gas Outlet Compressor [2N] to a pressure of 147 psia [210], the operating pressure of the $CO_2$ Enrichment Stage 2 Aerator [2E] located in the second of three $CO_2$ Enrichment Stages within the $CO_2$ Separation and Enrichment Process.

FIG. 5A $CO_2$ Enrichment Stage 2

In FIG. 5A, the $CO_2$ Enrichment Stage 2 Aerator [2E], located in the second of three $CO_2$ Enrichment Stages within the $CO_2$ Separation and Enrichment Process, receives compressed deaerated atmospheric gases from the $CO_2$ Enrichment Stage 1 Gas Outlet Compressor [2N] at a pressure of 147 psia [210] for aeration of water. In the water aeration process, carbon dioxide and some of the other atmospheric gases are dissolved into the water. Atmospheric gases not dissolved in the water are released to the atmosphere or are used for reaeration of the deaerated natural water before it is discharged back into the environment.

Water used in the aeration process in the $CO_2$ Enrichment Stage 2 Aerator [2E] is deaerated water containing a minimal concentration of dissolved gases. This water, which is recycled between the $CO_2$ Enrichment Stage 2 Aerator [2E] and the $CO_2$ Enrichment Stage 2 Deaerator [2F], is deaerated at 14.7 psia [211] in the $CO_2$ Enrichment Stage 2 Deaerator [2F]. The $CO_2$ Enrichment Stage 2 Water Recycle Pump [2O] pumps the water in a continuous recycle loop from 14.7 psia [211], the operating pressure of the $CO_2$ Enrichment Stage 2 Deaerator [2F], to 147 psia [212], the operating pressure of the $CO_2$ Enrichment Stage 2 Aerator [2E]. Aerated water from the $CO_2$ Enrichment Stage 2 Aerator [2E] flows back to the $CO_2$ Enrichment Stage 2 Deaerator [2F] across a pressure letdown valve [V23], where the water pressure is reduced from 147 psia [212] back to 14.7 psia [211].

Atmospheric gases from the $CO_2$ Enrichment Stage 2 Deaerator [2F] are compressed from a pressure of 14.7 psia [213] by the $CO_2$ Enrichment Stage 2 Gas Outlet Compressor [2P] to a pressure of 147 psia [214], the operating pressure of the $CO_2$ Enrichment Stage 3 Aerator [2G] located in the third of three $CO_2$ Enrichment Stages within the $CO_2$ Separation and Enrichment Process.

FIG. 5A $CO_2$ Enrichment Stage 3

In FIG. 5A, the $CO_2$ Enrichment Stage 3 Aerator [2G], located in the third of three $CO_2$ Enrichment Stages within the $CO_2$ Separation and Enrichment Process, receives compressed deaerated atmospheric gases from the $CO_2$ Enrichment Stage 2 Gas Outlet Compressor [2P] at a pressure of 147 psia [214] for aeration of water. In the water aeration process, carbon dioxide and some of the other atmospheric gases are dissolved into the water. Atmospheric gases not dissolved in the water are released to the atmosphere or are used for reaeration of the deaerated natural water before it is discharged back into the environment.

Water used in the aeration process in the $CO_2$ Enrichment Stage 3 Aerator [2G] is deaerated water containing a minimal concentration of dissolved gases. This water, which is recycled between the $CO_2$ Enrichment Stage 3 Aerator [2G] and the $CO_2$ Enrichment Stage 2 Deaerator [2H], is deaerated at 14.7 psia [215] in the $CO_2$ Enrichment Stage 2 Deaerator

[2H]. The $CO_2$ Enrichment Stage 3 Water Recycle Pump [2Q] pumps the water in a continuous recycle loop from 14.7 psia [215], the operating pressure of the $CO_2$ Enrichment Stage 3 Deaerator [2H], to 147 psia [216], the operating pressure of the $CO_2$ Enrichment Stage 3 Aerator [2G]. Aerated water from the $CO_2$ Enrichment Stage 3 Aerator [2G] flows back to the $CO_2$ Enrichment Stage 3 Deaerator [2H] across a pressure letdown valve [V24], where the water pressure is reduced from 147 psia [216] back to 14.7 psia [215].

Atmospheric gases rich in carbon dioxide from the $CO_2$ Enrichment Stage 3 Deaerator [2H], are compressed from a pressure of 14.7 psia [217] by the $CO_2$ Enrichment Stage 3 Gas Outlet Compressor [2R] to a pressure of 147 psia [218] (or another pressure suitable for $CO_2$ sequestration).

VIII. Detailed Description of the Graphs Associated with FIG. 4A and FIG. 5A

FIG. 4E and FIG. 5E are graphs that show gas and water process stream flowrates required to capture, separate, and enrich 1 ton/day of carbon dioxide directly from air (FIG. 4E) and indirectly from water in equilibrium with the air at 0° C. (FIG. 5E). The graphs show that, as the carbon dioxide equilibrium concentrations between the gas and water streams increase in each $CO_2$ separation and enrichment stage, considerably less water is required for enriching a given quantity of carbon dioxide; consequently, the gas and water process flowrates in each enrichment stage decrease accordingly.

The graphs in FIG. 4E and FIG. 5E also show two sets of flowrate plots for both the gas and the water process streams as follows:
  Required gas and water process stream flowrates if the aerators were operated at atmospheric pressure, i.e., 14.7 psia (0 psig).
  Required gas and water process stream flowrates if the aerators were operated at an operating pressure that is an order of magnitude higher than atmospheric pressure, i.e., 147 psia (132.3 psig).

The two sets of flowrates shown on FIG. 4E and FIG. 5E for both the gas and water process streams were plotted to specifically show that the required gas and water flowrates to and from the aerators, respectively, decrease proportionally to the increase in aerator operating pressure above atmospheric pressure.

However, the aerators do not necessarily need to operate at the operating pressure shown on the Process Flow Diagrams (i.e., one order of magnitude higher than atmospheric pressure). Aerator operating pressures and corresponding gas and liquid flowrates can be optimized with respect to operational efficiencies and/or with respect to capital and operational costs, etc. For example, as shown in FIG. 4F, which is a graph that plots gas and water flowrates from the aerators in FIG. 4A as a function of aerator pressure, both gas and water process stream flowrates can be significantly reduced with increasing aerator operating pressure. Because of this added operational flexibility, sizing of process equipment (e.g., aerators, pumps, compressors, piping, etc.) can be optimized while minimizing their operating and capital costs.

IX. Design Considerations for the Water Deaerators

Deaeration of water in the industry today, such as in steam power plants, requires deaerators that remove all traces of oxygen that cause corrosion of piping and equipment. In so doing, all atmospheric gases are removed along with the oxygen, including carbon dioxide. Because removing all of the carbon dioxide from water for sequestration through deaeration is not as important as removing all of the oxygen from water to prevent corrosion, not all of the carbon dioxide in the water needs to be removed. Therefore, deaeration of water to capture carbon dioxide for sequestration does not necessarily need to be done in the same manner as that used in steam power plants.

The primary goal of capturing carbon dioxide for sequestration would be to capture as much carbon dioxide as possible with minimal capital and operating costs, even if all the carbon dioxide is not removed from the water. Therefore, sophisticated equipment, such as that required to remove oxygen from water, may not be applicable (or even practical) for removing carbon dioxide from water.

As a large quantity of water would need to be processed to remove small amounts of carbon dioxide, efficiency of carbon dioxide removal would need to be optimized. However, this higher efficiency may prove to be too costly considering the large quantity of water involved. Therefore, it may prove to be more cost effective to process a larger volume of water to maximize carbon dioxide capture than it would be to improve the carbon dioxide removal efficiency from a smaller volume of water. Again, there is no need or requirement for removing all of the carbon dioxide from the water as is required in the removal of oxygen from water in steam power plants.

Design of Deaerators Used in Industry Today

Deaeration is used in the upstream oil & gas industry to remove oxygen from seawater, preventing or reducing corrosion, and growth of bacteria. (From "*Deaeration,*" *Wikipedia, the free encyclopedia*, http://en.wikipedia.org/wiki/Deaeration.)

The seawater is used for water injection of the reservoir to enhance oil production. Two types of seawater deaeration are commonly used, vacuum deaeration and gas stripping deaeration, the former using 'pressure reduction' as the method of liquid degasification, the latter using 'substitution by inert gas' as the method of liquid degasification. Other more expensive, but effective liquid degasification methods used are heating and membrane degasification. (From "*Degasification,*" *Wikipedia, the free encyclopedia*, http://en.wikipedia.org/wiki/Degasification.)

A comprehensive process description of surface water treatment and dissolved gas removal from natural water is provided in PetroWiki, published by SPE International as follows:
  "*Surface water treatment for injection,*" *PetroWiki*, Published by SPE International, http://petrowiki.org/Surface_water_treatment_for_injection.

Suppliers of water deaeration equipment for the oil & gas industry, each primarily using vacuum deaeration and gas stripping as the method of liquid deaeration, can be found on the internet as follows:
  "*Eta Process Plant,*" Koch-Glitsch, http://www.koch-glitsch.com/process/pages/eta-process-plant.aspx.
  "*Seawater Deaerators,*" Edwards-Hick Hargreaves, http://psscorp.co.th/upload/news/20110830105340.pdf (www.edwardsvacuum.com).
  "*Process Vacuum,*" BOC Edwards, http://www.el-control.dk/katalog/kapitel7.pdf (www.edwardsvacuum.com).
  "*Deaeration,*" Enhydra Ltd, Produced Water Specialists, http://enhydra.co.uk/en-wp/wp-content/uploads/2013/07/Deaeration.pdf (www.enhydra.co.uk).
  "*Seawater Injection System,*" Fluid Technologies, http://www.fluidtechnologies.org/SEAWATERINJECTION-SYSTEM.html.

X. Design Considerations for the Natural Water Deaerator

To minimize capital costs, the design of the Natural Water Deaerator should be as small and as simple as possible considering the large quantity of water required to capture the small amount of carbon dioxide dissolved in it. Residence time of the water in the Natural Water Deaerator should be minimized as this will directly affect the deaerator size. Residence time should, therefore, be determined based on the rate of carbon dioxide captured as a function of deaerator size or, more precisely, as a function of residence time of the water in the deaerator.

As evidenced by a sudden release of a large quantity of carbon dioxide gas when a Coke can is opened, a large quantity of dissolved atmospheric gases should also be released from the water when subjected to a vacuum. The Natural Water Deaerator should be designed to maximize degasification of the atmospheric gases from the natural water. Degasification within the Natural Water Deaerator can be optimized by:
 1. Maximizing the vacuum of the Natural Water Deaerator
 2. Maximizing gas nucleation within and removal from the Natural Water Deaerator Degasification Degassing of gases in liquid at reduced pressure is explained as follows:
  Degasification is the removal of dissolved gases from liquids, especially water or aqueous solutions. The solubility of gas obeys Henry's law, that is, the amount of a dissolved gas in a liquid is proportional to its partial pressure. Therefore, placing a solution under reduced pressure makes the dissolved gas less soluble. Sonication and stirring under reduced pressure can usually enhance the efficiency. This technique is often referred to as Vacuum degasification. (From "*Degasification,*" *Wikipedia, the free encyclopedia*, http://en.wikipedia.org/wiki/Degasification.)

At a vacuum of 28 inches Hg, water boils at about 98° F. (36.7° C.); therefore, if water below this temperature were subjected to a vacuum of 28 inches Hg, then it would not boil. However, dissolved atmospheric gases would be degassed from the water, appearing as if the water is actually boiling. Natural water in equilibrium with the atmosphere at temperatures below 98° F. (36.7° C.) would do the same if subjected to a vacuum.

Gas Nucleation

Nucleation of gases in liquid at reduced pressure is explained as follows:
  Bubbles of carbon dioxide nucleate shortly after the pressure is released from a container of carbonated liquid such as Coca-Cola or champagne. Nucleation often occurs more easily at a pre-existing interface (heterogeneous nucleation), as happens on boiling chips and string used to make rock candy. The so-called Diet Coke and Mentos eruption is a dramatic example of this. (From "*Nucleation,*" *Wikipedia, the free encyclopedia*, http://en.wikipedia.org/wiki/Nucleation.)

The "so-called Diet Coke and Mentos eruption" is explained as follows:
  A Diet Coke and Mentos eruption (alternately Diet Coke and Mentos geyser or Mentos eruption) is a reaction between the carbonated beverage Coca Cola's Diet Coke and Mentos mints that causes the beverage to spray out of its container. The gas released by the sweets/mints pushes all of the liquid up and out of the bottle for a huge explosion. The structure of Mentos is a significant cause of the eruption because of its nucleation sites. The surface of the mint Mentos is covered with many small holes that increase the surface area available for reaction (and thus the quantity of reagents exposed to each other at any given time), thereby allowing carbon dioxide bubbles to form with the rapidity and quantity necessary for the "jet"- or "geyser"- or eruption like nature of the effusion. This hypothesis gained further support when rock salt was used as a "jump start" to the reaction. (From "*Diet Coke and Mentos eruption,*" *Wikipedia, the free encyclopedia*, http://en.wikipedia.org/wiki/Diet_Coke_and_Mentos_eruption.)

Rapid nucleation of dissolved gas bubbles in a liquid subjected to a lower pressure, similar to that evidenced by the "so-called Diet Coke and Mentos eruption," should be considered while designing the Natural Water Deaerator to induce rapid degassing of the dissolved atmospheric gases from the water. Additionally, corrugated plate interceptors (CPIs), commonly used in the oil & gas industry for separating tiny oil droplets from oily water, should also be considered while designing the Natural Water Deaerator to assist tiny gas bubbles in their slow rise to the surface where they can be easily removed.

Not all the atmospheric gases can be removed from the water, but there is no need to. Nonetheless, every effort should be made to maximize carbon dioxide capture without unnecessarily consuming capital cost and operational expenditures.

XI. Design Considerations for the Carbon Dioxide Enrichment Stage Deaerators

Contrary to the design of the Natural Water Deaerator, which does not need to remove all dissolved carbon dioxide from the water (from a practical and economic perspective), the Carbon Dioxide Enrichment Stage 1, 2, and 3 Deaerators should be designed requiring minimum loss of carbon dioxide that had already been captured in the Natural Water Deaerator. As the aeration/deaeration water cycle streams for the three Carbon Dioxide Enrichment Stages are relatively small, compared to that through the Natural Water Deaerator, high efficiency vacuum deaeration equipment should be considered in the Carbon Dioxide Enrichment Stage 1, 2, and 3 Deaerator design.

Specific details of high efficiency vacuum deaeration equipment for the oil & gas industry can be found on the internet as follows:
  "*Nitrogen Deaeration and Vacuum Deaeration Products,*" GasTran Systems, http://www.gastransfer.com/.
  "*Single-stage Vacuum Deaeration Technology for Achieving Low Dissolved Gas in Process Water,*" GasTran Systems, (Paper, IWC-08-22, presented by Glenn Harbold and Jonathan Park at the International Water Conference—San Antonio, Tex. October 2008), http://www.gastransfer.com/documents/IWC2008.pdf.

XII. Alternative Pumping Configurations for the Natural Water Deaerator

An Inlet Natural Water Pump is normally required to pump natural water (i.e., water in equilibrium with the atmosphere) from its source (e.g., lake, river, etc.) to the Natural Water Deaerator. Because the Natural Water Deaerator operates in a vacuum, an Outlet Natural Water Pump would normally be required to return the natural water back to its source. However, pumping and power requirements are dependent on the design and elevation of the Natural Water Deaerator. Five hypothetical design scenarios are discussed below.

Design 1: Horizontal Natural Water Deaerator in Line with the Natural Flow of Water The Natural Water Deaerator is horizontal located at or below water level.

The Natural Water Deaerator Inlet Pump is not required as water naturally flows through the deaerator when the deaerator pressure is either at atmospheric pressure (e.g., 14.7 psia) or operating under full vacuum during normal operation.

The Natural Water Deaerator Outlet Pump is required when the deaerator pressure is under full vacuum.

Advantages: The design is well suited for processing river water and would theoretically take advantage of the natural flowing river water in lieu of the Natural Water Deaerator Inlet/Outlet Pumps.

Disadvantages: River level would rise and fall and, therefore, the designed facility would need to be installed within a floating structure.

Design 2: Vertical Natural Water Deaerator Above Water Level

The Natural Water Deaerator is vertical with different inlet and outlet elevations above the normal water level. In the scenario, the Natural Water Deaerator inlet nozzle elevation is 60 ft. and the Natural Water Deaerator outlet nozzle elevation is 20 ft.

The Natural Water Deaerator Inlet Pump is operating at reduced power when the deaerator is operating at full vacuum as compared to that at atmospheric pressure (e.g., 14.7 psia).

The Natural Water Deaerator Outlet Pump is required when the deaerator is operating under full vacuum, but the Natural Water Deaerator outlet valve must be throttled when the deaerator is at atmospheric pressure (e.g., 14.7 psia).

Advantages: The design would allow use of a vertical vessel such as a packed column for vacuum deaeration of the water.

Disadvantages: The design would require operation of both the Natural Water Deaerator Inlet and Outlet Pumps.

Design 3: Horizontal Natural Water Deaerator Above Water Level without the Natural Water Deaerator Outlet Pump The Natural Water Deaerator is horizontal with the same inlet and outlet elevations and located on Land or Platform over Water. Its elevation was calculated that would eliminate the need for the Natural Water Deaerator Outlet Pump. In the scenario, both the Natural Water Deaerator inlet and outlet nozzle elevations are 50 ft.

The Natural Water Deaerator Inlet Pump is operating at reduced power when the deaerator is operating at full vacuum as compared to that at atmospheric pressure (e.g., 14.7 psia).

The Natural Water Deaerator Outlet Pump is not required during normal operation.

The Natural Water Deaerator outlet valve must be throttled when the deaerator pressure is at atmospheric pressure (e.g., 14.7 psia).

Advantages: The design would eliminate power requirements for the Natural Water Deaerator Outlet Pump and minimize the power requirements for the Natural Water Deaerator Inlet Pump.

The design is well suited for an offshore platform.

Disadvantages: Elimination of the Natural Water Deaerator Inlet Pump would require that the Natural Water Deaerator be located at a high elevation.

Design 4: Horizontal Natural Water Deaerator Above Water Level without the Natural Water Deaerator Inlet Pump The Natural Water Deaerator is horizontal with the same inlet and outlet elevations. Its elevation was calculated that would eliminate the need for the Natural Water Deaerator Inlet Pump. In the scenario, both the Natural Water Deaerator inlet and outlet nozzle elevations are 27 ft.

The Natural Water Deaerator Inlet Pump is not required during normal operations.

The Natural Water Deaerator outlet valve at the discharge of the Natural Water Deaerator Outlet Pump must be throttled when the deaerator is at atmospheric pressure (e.g., 14.7 psia).

Advantages: The design would eliminate power requirements for the Natural Water Deaerator Inlet Pump and minimize the power requirements for the Natural Water Deaerator Outlet Pump during normal operation.

Disadvantages: A Natural Water Deaerator Inlet Pump is still required to prime the Natural Water Deaerator at atmospheric pressure (e.g., 14.7 psia) on loss of deaerator vacuum.

Design 5: Horizontal Natural Water Deaerator Above Water Level without Either the Natural Water Deaerator Inlet or Outlet Pump The Natural Water Deaerator is horizontal with the same inlet and outlet elevations. Its elevation was calculated that would eliminate the need for both the Natural Water Deaerator Inlet and Outlet Pumps. In the scenario, both the Natural Water Deaerator inlet and outlet nozzle elevations are 27 ft.

Both the Natural Water Deaerator Inlet and Outlet Pumps are not required during normal operations.

The Natural Water Deaerator outlet valve must be throttled when the deaerator is at atmospheric pressure (e.g., 14.7 psia).

The Natural Water Deaerator outlet valve discharges at a point that is 13.3 ft below datum, i.e., below the water level at the Natural Water Deaerator intake, thereby driving a siphon that provides suction flow normally provided by the Natural Water Deaerator Outlet Pump.

Advantages: The design would eliminate power requirements for both the Natural Water Deaerator Inlet and Outlet Pumps during normal operation.

Disadvantages: A Natural Water Deaerator Inlet Pump is still required to prime the Natural Water Deaerator on loss of deaerator vacuum.

A location that would facilitate a siphon design would be required.

XIII. Carbon Dioxide Capture from Air Using Air Compressors Powered by a Solar Power Facility To extract carbon dioxide from air, an air compression facility would be required. Electrical power to operate such a facility would need to be produced from a renewable energy source such as solar power. Consequently, to extract a significant quantity of carbon dioxide from the atmosphere, a solar power facility would be required such as the recently commissioned Ivanpah Solar Power Facility located in the California Mojave Desert.

A. The Ivanpah 392 MW (Gross) Solar Power Facility

The following is from an article in the website of *Wikipedia, the free encyclopedia*, entitled, "*Ivanpah Solar Power Facility*" (http://en.wikipedia.org/wiki/Ivanpah_Solar_Power Facility).

The Ivanpah Solar Electric Generating System is a solar thermal power plant covering roughly 4,000 acres (1,600 ha) in the California Mojave Desert, 64 km (40 miles) southwest of Las Vegas, with a gross capacity of 392 megawatts (MW). Having a nameplate gross capacity of 392 MW (377 MW net), the Ivanpah Power Facility is considered the largest solar thermal power station in the world. It formally opened Feb. 13, 2014.

The performance of the Ivanpah Power Facility is described as follows:

- A claimed capacity factor of 31.4% implies that the plant will operate for 365 days*24 hours*31.4%=2751 hours/year. At 377 MW (net nameplate capacity) constant power, this means a generation of 377 MW*2751 hours/year=1,037,127 MW-h/year rounding up to 1.04 TW-h/year.
- The facility deploys 173,500 heliostats, each with two mirrors, focusing solar energy on boilers located on three centralized solar power towers. One heliostat mirror is a 75.6 square feet (7.02 $m^2$) reflecting surface, for a total of 151.2 square feet (14.05 $m^2$) per heliostat. Total plant heliostat reflecting surface results in 173,500 heliostats*14.05 $m^2$/heliostat=2,437,144 $m^2$.
- The local irradiance is about 7.4 kW-h/$m^2$/day (annual average) for a total solar energy flow in the visible spectrum of 2,717 kW-h/$m^2$ yearly or 2.717 MW-h/$m^2$ yearly. Based on irradiance, the intercepted solar energy flow is 2.717 MW-h/$m^2$/year*2,437,144 $m^2$=6,621,720 MW-h yearly.
- The steam plant is designed for 28.72% gross efficiency. Thermal yield, after taking into consideration reflection, transmission, radiation and absorption losses, is about 55%, resulting in a thermal power input to the steam turbines of 6,621,720 MW-h*55%=3,641,946 MW-$h_{th}$. Resulting expected energy output is 3,641,946 MW-$h_{th}$*28.72% efficiency=1,045,967 MW-h/year, rounding up to 1.05 TW-h/year.
- The estimated construction costs for the project of $2.18 billion ($5,561.00 per gross KW) falls between the construction costs for coal and nuclear power plants, according to Synapse Energy Economics, but this does not account for the less favorable capacity factor (31.4%) of solar power.

B. Carbon Dioxide Capture from Air Using Air Compressors Powered by an Ivanpah Equivalent Solar Power Facility The quantity of carbon dioxide that can be removed from air using ninety 30,000 scfm air compressors powered by a power plant similar to the Ivanpah Solar Power Facility is as tabulated in Table 4.

TABLE 4

Carbon Dioxide Removed from Air Using Ninety 30,000 scfm Air Compressors Powered by an Ivanpah Solar Power Facility

| | |
|---|---|
| Net power produced by the Ivanpah Solar Power Facility | 377 MW |
| Electric Motor Rating for a 30,000 scfm air compressor | 5.6 MW |
| Power recovered (25%) by air pressure reduction via an expander | 1.4 MW |
| Net power required for each 30,000 scfm air compressor | 4.2 MW |
| No. of 30,000 scfm air compressors that can be powered by 377 MW | 89.76 (≈ 90) |
| Annual carbon dioxide removed by a 30,000 scfm air compressor | 155.87 tons/yr |
| Total annual carbon dioxide removed by 90 air compressors | 14,028 tons/yr |

Additionally, during the air compression process, water vapor in the air that would be condensed in these compressors could be collected and utilized for commercial use. If this Solar Power Facility were located in southern New Mexico, between approximately 25 MM to 30 MM gallons of water per year could be produced and utilized for productive purposes.

Table 5 is a tabulation of greenhouse gas equivalencies of the 14,028 tons/yr carbon dioxide removed from air using the ninety 30,000 scfm air compressors. The greenhouse gas equivalencies were calculated using the Greenhouse Gas Equivalencies Calculator provided by the United States Environmental Protection Agency (EPA) linked to their website as follows:

"*Calculations and References*," http://www.epa.gov/cleanenergy/energy-resources/refs.html "*Greenhouse Gas Equivalencies Calculator*," http://www.epa.gov/cleanenergy/energy-resources/calculator.html#results, United States Environmental Protection Agency—Clean Energy To determine the Greenhouse Gas Equivalencies after 100 years of operation, the equivalencies tabulated in Table 5 would need to be multiplied by 100.

FIG. 4G is a graph that plots greenhouse gas equivalencies of carbon dioxide removed from air for 100 years using ninety 30,000 scfm air compressors powered by an Ivanpah Equivalent Solar Power Facility.

As shown on FIG. 1, to hypothetically reduce the carbon dioxide concentration in the air from 400 ppm to 300 ppm in 100 years, an estimated 750,000,000,000 (750 billion) tons of carbon dioxide would need to be removed from the atmosphere. Based on the removal of carbon dioxide from the air at an Ivanpah equivalent Solar Power Facility of 14,028 tons/year (or 1,402,800 tons over 100 years), approximately 534,645 similar facilities would be required worldwide to remove the desired quantity of carbon dioxide from the air.

TABLE 5

Greenhouse Gas Equivalencies of Carbon Dioxide Removed from Air using Ninety 30,000 scfm Air Compressors Powered by an Ivanpah Equivalent Solar Power Facility

| | |
|---|---|
| Carbon Dioxide Removed from Air per Year: | |
| 14,028 | Tons |
| 12,726 | Metric Tons |
| Annual Greenhouse Gas Emissions from: | |
| 2,679 | Passenger Vehicles |
| 30,299,969 | Miles/Year Driven by an Average Passenger Vehicle |
| 4,561 | Tons of Waste Sent to the Landfill |
| 652 | Garbage Trucks of Waste Recycled Instead of Landfilled |
| Carbon Dioxide Emissions from: | |
| 1,431,978 | Gallons of Gasoline Consumed |
| 13,669,159 | Pounds of Coal Burned |
| 168 | Tanker Trucks' Worth of Gasoline |
| 1,161 | Homes' Energy Use for One Year |
| 3.5 | Wind Turbines Installed |
| 1,750 | Homes' Electricity Use for One Year |
| 68.2 | Railcars Worth of Coal Burned |
| 332,880 | Incandescent Lamps Switched to CFLs |
| 29,595 | Barrels of Oil Consumed |
| 530,249 | Propane Cylinders Used for Home Barbeques |
| 0.003 | Coal-Fired Power Plants in One Year |
| Carbon Sequestered by: | |
| 326,307 | Tree Seedlings Grown for 10 Years |
| 10,431 | Acres of U.S. Forests in One Year |
| 98.3 | Acres of U.S. Forests Preserved from Conversion to Cropland in One Year |

XIV. Carbon Dioxide Capture from Natural Water Using Water Siphoning Around Niagara Falls Water siphoning as a means to capturing carbon dioxide for sequestration can be applied in any location where there is a drop in water elevation significant enough to be effective, i.e., where the source of supply water to the Natural Water Deaerator is at an elevation higher than the point of water discharge from the Natural Water Deaerator. In a similar application, as described in the following references, water siphoning has been previously studied by the Northwest and Alaska Fisheries Center of the National Marine Fisheries Service and funded by the United States Army Corp of Engineers as a means to reduce supersaturation of dissolved gases (mainly nitrogen) in water supplies of fish hatcheries.

Earl M. Dawley, Clifford W. Long, and Bruce H. Monk, "Feasibility of Using Siphons for Degassing Water," Final Report of Research, U.S. Army Corp of Engineers, http://www.nwfsc.noaa.gov/assets/26/6565_07162010_084721_Dawley.etal.1978-rev.pdf.

Bruce H. Monk, Clifford W. Long, and Earl M. Dawley, "Feasibility of Siphons for Degassing Water," Transactions of the American Fisheries Society, Volume 109, Issue 6, 1980, pages 765-768, http://www.tandfonline.com/doi/abs/10.1577/1548-8659%281980%-29109%3C765%3AFOSFDW%3E2.0.CO%3B2?-journalCode=utaf20#preview.

A good location for using a water siphon is around or over a waterfall, such as Victoria Falls or Niagara Falls, where a river or lake changes elevations. Power requirements for a water siphon are minimal as no power is required for pumping aerated natural water for deaeration. As described in Design 5 above, neither a Natural Water Deaerator Inlet Pump nor a Natural Water Deaerator Outlet Pump is required.

The flow of water over Niagara Falls will be used to demonstrate the effectiveness of using water siphoning to capture carbon dioxide for sequestration purposes from natural water. According to the following two articles in Wikipedia, the free encyclopedia, the elevation difference between Lake Erie (569.2 ft) and Lake Ontario (243.3 ft) is 325.9 ft, with the majority of this, more than 165 feet, being over Niagara Falls. More than six million cubic feet (45,000,000 gallons) of water falls over the crest line of Niagara Falls every minute in high flow and almost four million cubic feet (30,000,000 gallons) on average:

"Great Lakes," Wikipedia, the free encyclopedia, (http://en.wikipedia.org/wiki/Great_Lakes "Niagara Falls," Wikipedia, the free encyclopedia, (http://en.wikipedia.org/wiki/Niagara_Falls To be more precise, as per the following website, 150,000 gallons per second fall over the American and Bridal Veil Falls (176 feet high) and 600,000 gallons per second fall over Horseshoe Falls (167 feet high):

"Facts about Niagara Falls," http://www.niagarafallslive.com/Facts_about_Niagara_Falls.htm Assuming, as previously stated, that approximately 179 million gallons of water (at 0° C. and 1 atm) would need to be processed to affectively remove one ton of carbon dioxide from the air in equilibrium with it, the following tons per day of carbon dioxide can be captured from water flowing over Niagara Falls:

During high water flow of 45,000,000 gpm, 362 tons/day, or 132,069 tons/year $CO_2$ is captured During average water flow of 30,000,000 gpm, 241 tons/day or 88,046 ton/year $CO_2$ is captured.

More precisely, one ton of carbon dioxide per day is captured from water flowing at 124,306 gpm. To put this in perspective, one ton of carbon dioxide per day is captured from air at an air flowrate of slightly less than 30,000 scfm.

After capturing the carbon dioxide from the water for sequestration, the deaerated water from the Natural Water Deaerator, discharged back into the body of water that it originated from, will again adsorb carbon dioxide from the atmosphere downstream of the point of discharge to replace that removed by deaeration. This same water can be used to capture carbon dioxide for sequestration many times, effectively removing carbon dioxide from the atmosphere each time as it flows along its route to the sea.

Table 6 is a tabulation of greenhouse gas equivalencies of the 132,069 tons/yr carbon dioxide potentially removed from air using water siphoning around Niagara Falls. The greenhouse gas equivalencies were calculated using the Greenhouse Gas Equivalencies Calculator provided by the United States Environmental Protection Agency (EPA) linked to their websites:

"Calculations and References," United States Environmental Protection Agency—Clean Energy, http://www.epa.gov/cleanenergy/energy-resources/refs.html.

"Greenhouse Gas Equivalencies Calculator," United States Environmental Protection Agency—Clean Energy, http://www.epa.gov/cleanenergy/energy-resources/calculator.html#results.

To determine the Greenhouse Gas Equivalencies after 100 years of operation, the equivalencies tabulated in Table 6 would need to be multiplied by 100.

Figure 5F:
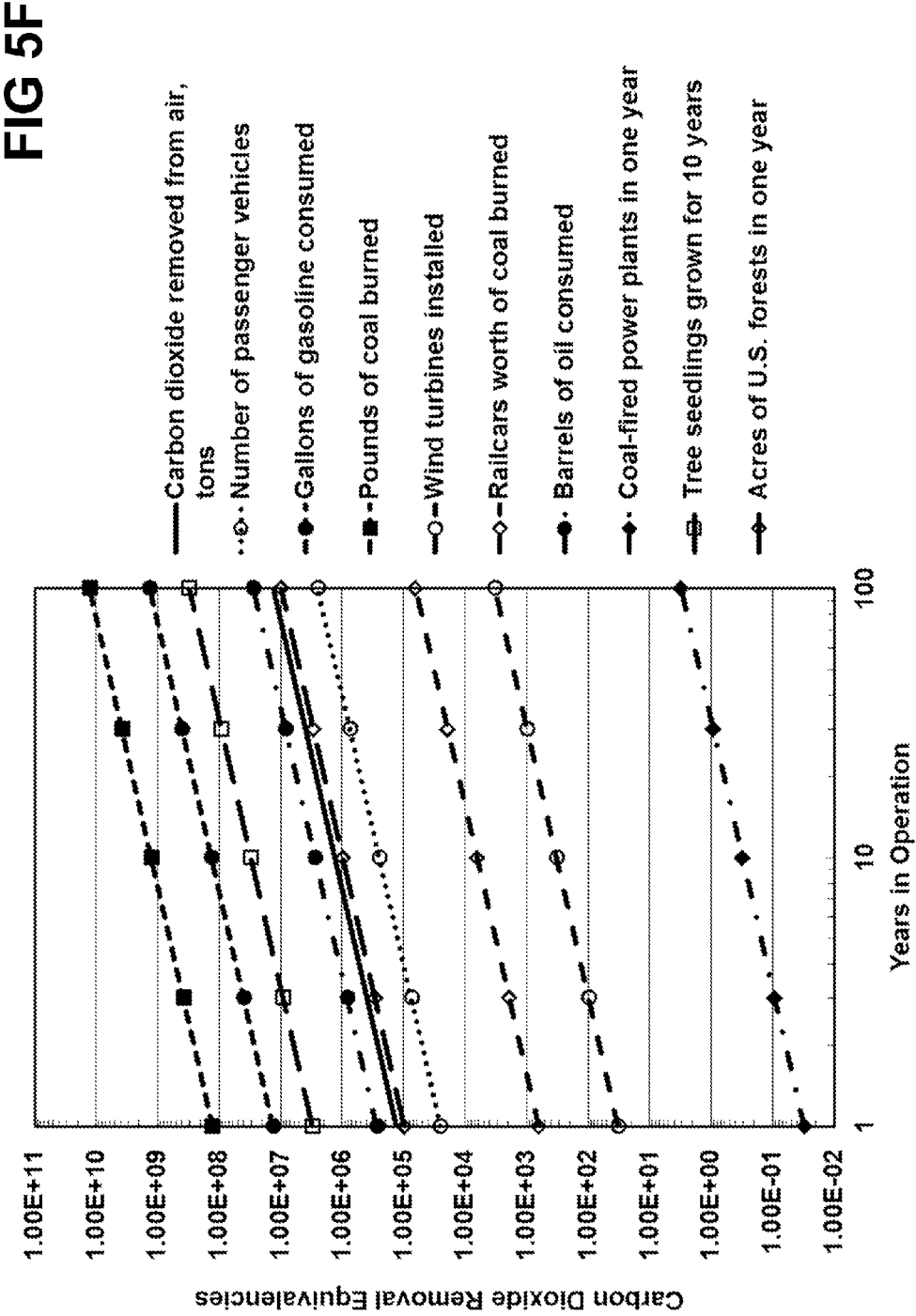
FIG. 5F is a graph that plots greenhouse gas equivalencies of carbon dioxide removed from water in equilibrium with air for 100 years using water siphoning of the natural water flowing over Niagara Falls.

FIG. 5F is a graph that plots greenhouse gas equivalencies of carbon dioxide removed from water in equilibrium with air for 100 years using water siphoning of the natural water flowing over Niagara Falls.

As shown on FIG. 1, to hypothetically reduce the carbon dioxide concentration in the air from 400 ppm to 300 ppm in 100 years, an estimated 750,000,000,000 (750 billion) tons of carbon dioxide would need to be removed from the atmosphere. Based on the removal of carbon dioxide from the air at Niagara Falls of 132,069 tons/year (or 13,206,900 tons over 100 years), approximately 56,788 similar facilities would be required worldwide to remove the desired quantity of carbon dioxide from the air.

TABLE 6

Greenhouse Gas Equivalencies of Carbon Dioxide Potentially Removed from Air Using Water Siphoning Around Niagara Falls

| Carbon Dioxide Removed from Air per Year: | |
|---|---|
| 132,069 | Tons |
| 119,811 | Metric Tons |
| Annual Greenhouse Gas Emissions from: | |
| 25,223 | Passenger Vehicles |
| 285,264,229 | Miles/Year Driven by an Average Passenger Vehicle |
| 42,943 | Tons of Waste Sent to the Landfill |
| 6,141 | Garbage Trucks of Waste Recycled Instead of Landfilled |
| Carbon Dioxide Emissions from: | |
| 13,481,600 | Gallons of Gasoline Consumed |
| 128,690,630 | Pounds of Coal Burned |
| 1,586 | Tanker Trucks' Worth of Gasoline |
| 10,932 | Homes' Energy Use for One Year |
| 33 | Wind Turbines Installed |
| 16,480 | Homes' Electricity Use for One Year |
| 642 | Railcars Worth of Coal Burned |
| 3,133,952 | Incandescent Lamps Switched to CFLs |
| 278,630 | Barrels of Oil Consumed |
| 4,992,124 | Propane Cylinders Used for Home Barbeques |
| 0.031 | Coal-Fired Power Plants in One Year |
| Carbon Sequestered by: | |
| 3,072,076 | Tree Seedlings Grown for 10 Years |
| 98,206 | Acres of U.S. Forests in One Year |
| 925 | Acres of U.S. Forests Preserved from Conversion to Cropland in One Year |

I claim:

1. A direct carbon dioxide capture process for removing carbon dioxide gas from air and enriching said carbon dioxide gas to a quality sufficient for sequestration, comprising of:
   A. a carbon dioxide gas separation and enrichment process for separating naturally low concentrations of said carbon dioxide gas from other atmospheric gases originating from said air while simultaneously enriching said carbon dioxide gas to a predetermined final carbon dioxide gas concentration necessary for sequestration and
   B. an air capture process that extracts said atmospheric gases from said air at atmospheric pressure and provides a compressed atmospheric gas feed containing low, but slightly enriched concentrations of said carbon dioxide gas to said carbon dioxide gas separation and enrichment process;
   C. said air capture process comprising:
      a. compressing said air extracted from said atmosphere at said atmospheric pressure with an air capture stage inlet air compressor to pressurize and establish flow of said air to an air capture stage aerator operating at a predetermined high air capture stage aerator pressure,
      b. aerating deaerated air capture stage recycle water with said air in said air capture stage aerator at said predetermined high air capture stage aerator pressure, resulting in said atmospheric gases being dissolved in said deaerated air capture stage recycle water forming aerated air capture stage recycle water,
      c. reducing pressure across an air capture stage pressure letdown valve of said aerated air capture stage recycle water flowing from said air capture stage aerator operating at said predetermined high air capture stage aerator pressure to an air capture stage deaerator operating at a predetermined low air capture stage deaerator pressure,
      d. deaerating said aerated air capture stage recycle water, originating from said air capture stage aerator, in said air capture stage deaerator operating at said predetermined low air capture stage deaerator pressure that is lower than the operating pressure within said air capture stage aerator, resulting in said atmospheric gases being removed from said aerated air capture stage recycle water forming said deaerated air capture stage recycle water,
      e. recirculating said deaerated air capture stage recycle water with an air capture stage water recycle pump to pressurize and establish flow of said deaerated air capture stage recycle water from said air capture stage deaerator operating at said predetermined low air capture stage deaerator pressure to said air capture stage aerator operating at said predetermined high air capture stage aerator pressure, and
      f. compressing said atmospheric gases with an air capture stage gas outlet compressor to pressurize and establish flow of said atmospheric gases from said air capture stage deaertor operating at said predetermined low air capture stage deaerator pressure to the first $CO_2$ enrichment stage aerator of said carbon dioxide separation and enrichment process operating at a predetermined high $CO_2$ enrichment stage aerator pressure;
   D. said carbon dioxide gas separation and enrichment process comprising of a predetermined plurality of $CO_2$ enrichment stages in series to achieve said predetermined final carbon dioxide gas concentration, each said $CO_2$ enrichment stage comprising:
      a. aerating deaerated $CO_2$ enrichment stage recycle water in said $CO_2$ enrichment stage aerator at said predetermined high $CO_2$ enrichment stage aerator pressure with said atmospheric gases from one of the following two process sources, depending on the location of said $CO_2$ enrichment stage within said predetermined plurality of said $CO_2$ enrichment stages, resulting in said atmospheric gases being dissolved in said deaerated $CO_2$ enrichment stage recycle water forming aerated $CO_2$ enrichment stage recycle water:
         i. if said $CO_2$ enrichment stage is the first said $CO_2$ enrichment stage in said carbon dioxide gas separation and enrichment process, said atmospheric gases are from said air capture stage gas outlet compressor of said air capture process, or
         ii. if said $CO_2$ enrichment stage is not the first said $CO_2$ enrichment stage in said carbon dioxide gas separation and enrichment process, said atmospheric gases are from said $CO_2$ enrichment stage gas outlet compressor of the previous said $CO_2$ enrichment stage in said carbon dioxide gas separation and enrichment process,
      b. reducing pressure across a $CO_2$ enrichment stage pressure letdown valve of said aerated $CO_2$ enrichment stage recycle water flowing from said $CO_2$ enrichment stage aerator operating at said predetermined high $CO_2$ enrichment stage aerator pressure to a $CO_2$ enrichment stage deaerator operating at a predetermined low $CO_2$ enrichment stage deaerator pressure,
      c. deaerating said aerated $CO_2$ enrichment stage recycle water, originating from said $CO_2$ enrichment stage aerator, in said $CO_2$ enrichment stage deaerator operating at said predetermined low $CO_2$ enrichment stage deaerator pressure that is lower than the operating pressure within said $CO_2$ enrichment stage aerator, resulting in said atmospheric gases being removed from said aerated $CO_2$ enrichment stage recycle water forming said deaerated $CO_2$ enrichment stage recycle water,
      d. recirculating said deaerated $CO_2$ enrichment stage recycle water with a $CO_2$ enrichment stage water recycle pump to pressurize and establish flow of said deaerated $CO_2$ enrichment stage recycle water from said $CO_2$ enrichment stage deaerator operating at said predetermined low $CO_2$ enrichment stage deaerator pressure to said $CO_2$ enrichment stage aerator operating at said predetermined high $CO_2$ enrichment stage aerator pressure, and
      e. compressing said atmospheric gases with a $CO_2$ enrichment stage gas outlet compressor to pressurize and establish flow of said atmospheric gases from said $CO_2$ enrichment stage deaerator operating at said predetermined low $CO_2$ enrichment stage deaerator pressure to one of the following two process sources, depending on the location of said $CO_2$ enrichment stage within said predetermined plurality of said $CO_2$ enrichment stages:
         i. if said $CO_2$ enrichment stage is not the last said $CO_2$ enrichment stage in said carbon dioxide gas separation and enrichment process, said atmospheric gases flow to said $CO_2$ enrichment stage aerator in the next said $CO_2$ enrichment stage operating at said predetermined high $CO_2$ enrichment stage aerator pressure, or
         ii. if said $CO_2$ enrichment stage is the last said $CO_2$ enrichment stage in said carbon dioxide gas separation and enrichment process, said atmospheric gases flow to another processing facility operating at another predetermined high pressure for further or final processing;

whereby said carbon dioxide gas, having a greater solubility in water than other said atmospheric gases in said air, is simultaneously separated from other said atmospheric gases originating from said air and enriched in said carbon dioxide gas separation and enrichment process to said predetermined final carbon dioxide gas concentration sufficient for sequestration of said carbon dioxide gas to reduce global warming and whereby said carbon dioxide gas is captured from said air to reduce said global warming using a safe, environmentally friendly, and efficient carbon dioxide capture process that would require no energy for heating, would require no chemical regeneration, would consume minimal or no water or, if incorporated in the design of said process facility, would be able to produce water from air with said air capture stage inlet air compressors, and would best be operated using renewable energy, especially solar energy in a desert.

* * * * *

UNITED STATES PATENT AND TRADEMARK OFFICE
CERTIFICATE OF CORRECTION

| | | |
|---|---|---|
| PATENT NO. | : 9,266,057 B1 | Page 1 of 2 |
| APPLICATION NO. | : 14/697466 | |
| DATED | : February 23, 2016 | |
| INVENTOR(S) | : Robert Lee Jones | |

It is certified that error appears in the above-identified patent and that said Letters Patent is hereby corrected as shown below:

Title Page, item (54), and in the Specification, Column 1, lines 1-6, second word in the Patent Title, 'or' should be -for-. The Patent Title should read, "Process for Separating and Enriching Carbon Dioxide from Atmospheric Gases in Air or from Atmospheric Gases Dissolved in Natural Water in Equilibrium with Air."

Title Page, item (57), line 6 in the Abstract, 'adsorbed' should be -absorbed-.

In the Specification

Column 5, lines 42 through 46, the first reference in the list:

'The United States Department of Agriculture
Forest Service, Methods for Calculating Forest Ecosystem and harvest Carbon with Standard Estimates for Forest Types of the United States, 2006, http://www.treesearch.fs.fed.us/pubs/22954' should be -Smith, James E.; Heath, Linda S.; Skog, Kenneth E.; and Birdsey, Richard A., "Methods for Calculating Forest Ecosystem and harvest Carbon with Standard Estimates for Forest Types of the United States," 2006, US Forest Service Research and Development website, "Treesearch," http://www.treesearch.fs.fed.us/pubs/22954-

Column 5, lines 47 through 50, the second reference in the list:

'United States Department of Agriculture:
Forest Service, Carbon Storage, and Accumulation in United States Forest Ecosystems, 1992, http://www.nrs.fs.fed.us/pubs/gtr/gtr_wo059.pdf' should be Signed and Sealed this
Twenty-first Day of June, 2016

Michelle K. Lee
*Director of the United States Patent and Trademark Office*

-United States Department of Agriculture, Forest Service, General Technical Report WO-59, "Carbon Storage, and Accumulation in United States Forest Ecosystems," 1992, http://www.nrs.fs.fed.us/pubs/gtr/gtr_wo059.pdf.-

Column 13, line 52, 'the' should be -The- and should read, "The Climate Institute in Australia."

Column 17, line 21, 'With' should be -with-; line 22, 'the' should be -The- and should read, "with Kilimanjaro Energy, Inc." and "The Trustees of Columbia University."

Column 18, line 39, 'the' should be -The- and should read, "The Trustees of Columbia University."

Column 31, Table 2, Note 3, the large gap in the website link should be removed. The website link should read, "http://ocw.tudelft.nl/fileadmin/ocw/courses/DrinkingWaterTreatment1/res00071/embedded/!4165726174696f6e20616e64204761732053747472697070696e6732303037.pdf."

Column 34, Table 3 (four places), 'g/m3 wtr/g/m3 Gas' should be -$(g/m^3$ wtr$)/(g/m^3$ gas$)$-.

Column 42, line 20, 'cost effective' should be -cost-effective-.

Column 50, line 1, 'adsorbed' should be -absorbed-.